(12) United States Patent
Sasai et al.

(10) Patent No.: US 9,124,871 B2
(45) Date of Patent: Sep. 1, 2015

(54) IMAGE DECODING METHOD, IMAGE CODING METHOD, IMAGE DECODING DEVICE AND IMAGE CODING DEVICE

(71) Applicant: Panasonic Intellectual Property Corporation of America, Torrance, CA (US)

(72) Inventors: Hisao Sasai, Osaka (JP); Takahiro Nishi, Nara (JP); Youji Shibahara, Osaka (JP); Toshiyasu Sugio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/506,737

(22) Filed: Oct. 6, 2014

(65) Prior Publication Data

US 2015/0030075 A1    Jan. 29, 2015

Related U.S. Application Data

(63) Continuation of application No. 13/813,759, filed as application No. PCT/JP2012/001400 on Mar. 1, 2012, now Pat. No. 8,923,633.

(60) Provisional application No. 61/449,734, filed on Mar. 7, 2011.

(51) Int. Cl.
*G06K 9/72* (2006.01)
*G06K 9/36* (2006.01)
(Continued)

(52) U.S. Cl.
CPC .......... *H04N 19/00733* (2013.01); *G06T 9/004* (2013.01); *H04N 19/00272* (2013.01);
(Continued)

(58) Field of Classification Search
None
See application file for complete search history.

(56) References Cited

U.S. PATENT DOCUMENTS 8,774,537 B2     7/2014   Kondo
8,923,633 B2 *  12/2014   Sasai et al. .................... 382/232
(Continued)

FOREIGN PATENT DOCUMENTS

JP     2001-61150     3/2001
JP     2010-166133    7/2010
(Continued)

OTHER PUBLICATIONS

International Search Report issued May 22, 2012 in International (PCT) Application No. PCT/JP2012/001400.

*Primary Examiner* — Andrae S Allison
(74) *Attorney, Agent, or Firm* — Wenderoth, Lind & Ponack, L.L.P.

(57) ABSTRACT

An image coding method is provided for coding, on a per-block basis, pictures each including slices. The method involves estimating a current motion vector which is a motion vector of a current block to be coded and specifies a reference block included in a reference picture; generating a prediction image block by allocating a value of an inside pixel to an outside pixel, the inside pixel being a pixel located inside an associated slice, the outside pixel being a pixel located outside the associated slice and included in the reference block specified by the current motion vector, and the associated slice being a slice included in the reference picture and corresponding to a current slice to be coded which includes the current block; subtracting the prediction image block from the current block to generate a difference image block; and coding the current motion vector and the difference image block.

10 Claims, 36 Drawing Sheets

(51) Int. Cl.

| | | |
|---|---|---|
| H04N 7/12 | (2006.01) | |
| H04N 19/583 | (2014.01) | |
| G06T 9/00 | (2006.01) | |
| H04N 19/105 | (2014.01) | |
| H04N 19/51 | (2014.01) | |
| H04N 19/117 | (2014.01) | |
| H04N 19/174 | (2014.01) | |
| H04N 19/17 | (2014.01) | |
| H04N 19/167 | (2014.01) | |
| H04N 19/137 | (2014.01) | |
| H04N 19/139 | (2014.01) | |
| H04N 19/176 | (2014.01) | |
| H04N 19/513 | (2014.01) | |
| H04N 19/52 | (2014.01) | |
| H04N 19/182 | (2014.01) | |

(52) U.S. Cl.
CPC ... *H04N19/00303* (2013.01); *H04N 19/00684* (2013.01); *H04N 19/105* (2014.11); *H04N 19/117* (2014.11); *H04N 19/137* (2014.11); *H04N 19/139* (2014.11); *H04N 19/167* (2014.11); *H04N 19/17* (2014.11); *H04N 19/174* (2014.11); *H04N 19/176* (2014.11); *H04N 19/51* (2014.11); *H04N 19/513* (2014.11); *H04N 19/52* (2014.11)

(56) References Cited

U.S. PATENT DOCUMENTS

| | | | |
|---|---|---|---|
| 2004/0208392 A1* | 10/2004 | Raveendran et al. | 382/268 |
| 2009/0060362 A1* | 3/2009 | Harmanci et al. | 382/238 |
| 2009/0316793 A1 | 12/2009 | Yang et al. | |
| 2010/0128995 A1* | 5/2010 | Drugeon et al. | 382/238 |
| 2010/0177821 A1* | 7/2010 | Kadoto et al. | 375/240.12 |
| 2011/0026600 A1* | 2/2011 | Kenji | 375/240.24 |
| 2012/0099657 A1* | 4/2012 | Tanaka et al. | 375/240.23 |
| 2012/0121188 A1* | 5/2012 | Kenji | 382/196 |
| 2012/0320976 A1* | 12/2012 | Suzuki et al. | 375/240.12 |
| 2013/0071038 A1* | 3/2013 | Kondo | 382/238 |
| 2013/0136373 A1* | 5/2013 | Sasai et al. | 382/233 |
| 2013/0301942 A1 | 11/2013 | Kondo | |
| 2014/0219338 A1 | 8/2014 | Komiya et al. | |

FOREIGN PATENT DOCUMENTS

| | | |
|---|---|---|
| JP | 2011-035620 | 2/2011 |
| JP | 2012-028863 | 2/2012 |

* cited by examiner

| Pixel position | Slice |
|---|---|
| (x1, y1) | A1 |
| (x2, y2) | A2 |
| (x3, y3) | A3 |
| (x4, y4) | A1 |
| (x5, y5) | A1 |
| (x6, y6) | A2 |
| ... | ... |

FIG. 22

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 25
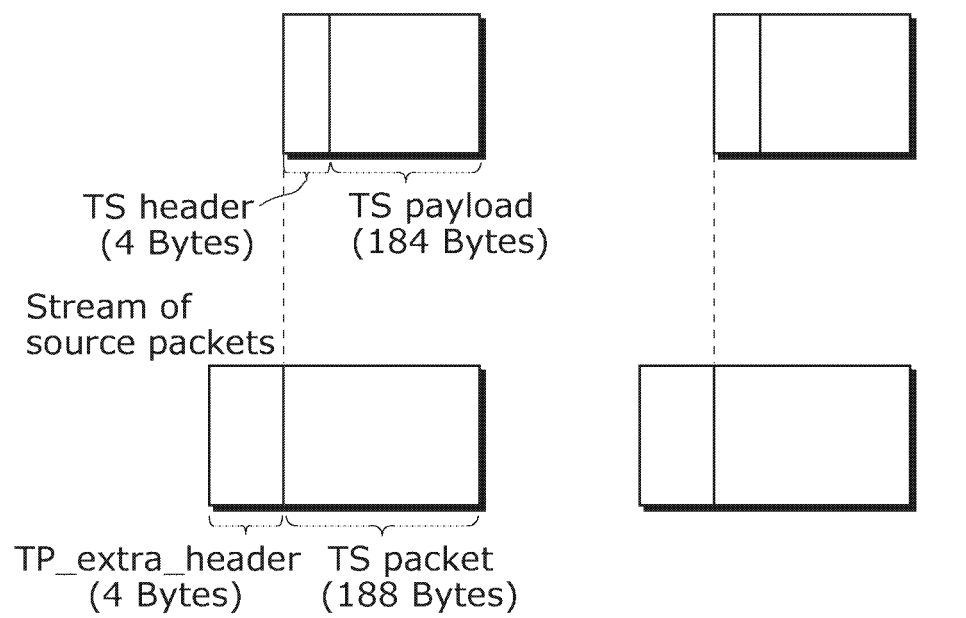
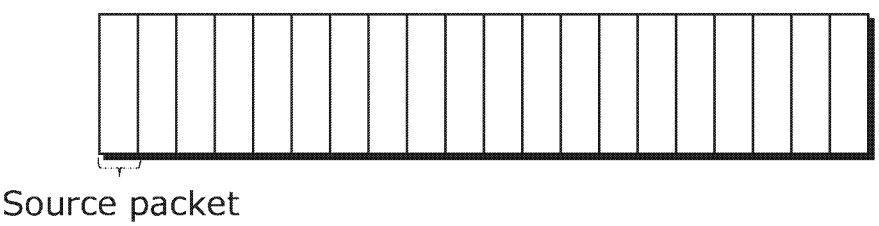

FIG. 33

| Corresponding standard | Driving frequency |
|---|---|
| MPEG-4 AVC | 500 MHz |
| MPEG-2 | 350 MHz |
| ⋮ | ⋮ |

IMAGE DECODING METHOD, IMAGE CODING METHOD, IMAGE DECODING DEVICE AND IMAGE CODING DEVICE

This application is a continuation of Ser. No. 13/813,759, filed Feb. 1, 2013, which is a National Stage of International Application No. PCT/JP2012/001400, filed Mar. 1, 2012, which claims the benefit of U.S. Provisional Application No. 61/449,734, filed Mar. 7, 2011, which are hereby incorporated by reference in their entirety.

TECHNICAL FIELD

The present invention relates to an image decoding method for decoding, on a per-block basis, pictures each including slices.

BACKGROUND ART

In an image coding process, a quantity of information is generally reduced by lessening redundancy in spatial and temporal directions. To lessen the redundancy in the spatial direction, an intra-frame (intra) prediction coding process is applied. To lessen the redundancy in the temporal direction, an inter-frame (inter) prediction coding process is applied.

In the inter-frame prediction coding process, a coded picture located before or after, in display order, a current picture to be coded is used as a reference picture. Through motion estimation between the reference picture and the current picture, a motion vector is then derived. Next, motion compensation using the motion vector is performed to generate prediction image data. Subsequently, the prediction image data is subtracted from image data of the current picture, with the result that the redundancy in the temporal direction is removed.

In the motion estimation, values of difference between a current block to be coded in the current picture and blocks in the reference picture are calculated, and one of the blocks in the reference picture for which the difference value is smallest is determined as a reference block. Using the current block and the reference block, a motion vector is then estimated.

In the moving picture coding scheme called H. 264, which has already been standardized, three types of pictures: I-picture, P-picture, and B-picture, are used to reduce the quantity of information. For the I-picture, no inter-frame prediction coding process is performed. In other words, for the I-picture, only an intra-frame prediction coding process is performed.

For coding the P-picture and the B-picture, inter-frame prediction coding is applied. For coding the P-picture, one coded reference picture located before or after the current picture in display order is referred to. For coding the B-picture, two coded reference pictures located before or after the current picture in display order are referred to. From reference blocks included in these reference pictures, prediction image data is obtained.

The motion vector usually points to a reference block in a reference picture. When the reference block pointed to by the motion vector is outside the reference picture, no pixel value can be obtained unless treated. There is therefore a restriction that the motion vector points to a reference block within the reference picture. Alternatively, a pixel value is copied from inside to outside of the reference picture. By doing so, prediction image data is obtained from a reference block outside the reference picture. Copying a pixel value from inside to outside of a reference picture is also referred to as pixel stretching.

FIG. 35A is a conceptual diagram showing a prediction image generation process according to the related art. In FIG. 35A, a motion vector of a current block to be processed, included in a current picture to be processed, points to a reference block located on a boundary of the reference picture. In such a case, there is no pixel value at, in the reference block, a pixel position outside the range of the reference picture unless a stretching process is performed, resulting in a failure to obtain effective prediction image data.

FIG. 35B is a conceptual diagram showing pixel stretching according to the related art. In the reference block, a value of a pixel located inside the reference picture is copied to a pixel located outside the reference picture. By doing so, the pixel located outside is complemented with the value. Thus, effective prediction image data is obtained.

Patent Literature (PTL) 1 discloses a pixel stretching method.

CITATION LIST

Patent Literature

[PTL 1] Japanese Unexamined Patent Application Publication No. 2001-61150

SUMMARY OF INVENTION

Technical Problem

However, even in the case where the motion vector points to a position within the reference picture, there is a possibility that the motion vector points to a position which is not appropriate for prediction image generation. For example, in H. 264, a picture may be divided into a plurality of slices. In this case, the information for use in intra-frame prediction is limited to information obtained from an image within the slice. Such limitation makes it possible to perform a parallel coding process or a parallel decoding process.

Furthermore, the slices which are different from each other may have different image characteristics. In such a case, limiting the information for use in intra-frame prediction to the information within the slice allows improvements in image quality, processing efficiency, and compression rate (also referred to as coding efficiency).

On the other hand, in inter-frame prediction, even when a picture is divided into slices, information on another slice included in another picture is usually referred to. Furthermore, since a boundary of a slice is not treated as an end of a picture, the slice is not enlarged. Thus, the use of information on another slice at the time of coding degrades image quality especially in a slice boundary area. In response, also in inter-frame prediction, it is conceivable to limit the use of another slice.

However, when referring to another slice is limited, the motion vector is forcibly changed in the slice boundary area so as to point to a position within the slice. In such a case, the motion vector is largely different between the slice boundary area and the other areas. This lowers the coding efficiency of the motion vector.

Specifically, a motion vector difference, which is a value of difference between motion vectors indicating substantially the same movement, is coded as a motion vector, thereby improving the coding efficiency. However, in the case where the motion vector largely changes, the difference becomes large accordingly, which lowers the coding efficiency.

Thus, the present invention aims to provide an image decoding method for decoding an image including a plurality of slices while reducing both a decrease in image quality and a decrease in coding efficiency.

Solution to Problem

In order to solve the above problem, the image decoding method according to an aspect of the present invention is an image decoding method for decoding, on a per-block basis, pictures each including slices, the method comprising: decoding a current motion vector and a difference image block, the current motion vector being a motion vector of a current block to be decoded and specifying a reference block included in a reference picture, and the difference image block indicating a difference between the current block and a prediction image block; generating the prediction image block by allocating a value of an inside pixel to an outside pixel, the inside pixel being a pixel located inside an associated slice, the outside pixel being a pixel located outside the associated slice and included in the reference block specified by the current motion vector, and the associated slice being a slice included in the reference picture and corresponding to a current slice to be decoded which includes the current block; and adding up the difference image block and the prediction image block to reconstruct the current block.

Furthermore, it may be that the image decoding method comprises storing, into a memory unit, identification information for identifying a range of the associated slice specified in each of reference pictures, and in the generating, the outside pixel and the inside pixel are determined by referring to the identification information stored in the memory unit, and the value of the inside pixel is allocated to the outside pixel to generate the prediction image block.

Furthermore, it may be that in the decoding, the identification information is decoded, and in the storing, the identification information resulting from the decoding is stored into the memory unit.

Furthermore, it may be that in the storing, the identification information is stored into the memory unit when the range of the associated slice has been changed.

Furthermore, it may be that in the decoding, applicability information is decoded, the applicability information indicating whether or not the value of the inside pixel is to be allocated to the outside pixel of the reference block, and in the generating, when the applicability information indicates that the value of the inside pixel is to be allocated to the outside pixel, the value of the inside pixel is allocated to the outside pixel of the reference block to generate the prediction image block.

Furthermore, it may be that the decoding includes decoding the applicability information indicating whether or not the value of the inside pixel is to be allocated to the outside pixel of the reference block which includes a boundary of the associated slice, and in the generating, when the applicability information indicates that the value of the inside pixel is to be allocated, the value of the inside pixel is allocated to the outside pixel of the reference block which includes the boundary of the associated slice, to generate the prediction image block.

Furthermore, it may be that the decoding includes decoding the applicability information indicating whether or not the value of the inside pixel is to be allocated to the outside pixel of the reference block which is entirely included in a non-associated slice different from the associated slice, and in the generating, when the applicability information indicates that the value of the inside pixel is to be allocated, the value of the inside pixel is allocated to the outside pixel of the reference block which is entirely included in the non-associated slice, to generate the prediction image block.

Furthermore, it may be that in the decoding, an offset value for shifting the associated slice is decoded, and in the generating, the associated slice is shifted by as much as the offset value, and the value of the inside pixel which is a pixel located inside the associated slice resulting from the shifting is allocated to the outside pixel which is a pixel located outside the associated slice resulting from the shifting, to generate the prediction image block.

Furthermore, it may be that in the generating, the value of the inside pixel which is a pixel spatially closest to the outside pixel among pixels included in the associated slice is allocated to the outside pixel, to generate the prediction image block.

Furthermore, an image coding method according to an aspect of the present invention is an image coding method for coding, on a per-block basis, pictures each including slices, the method comprising: estimating a current motion vector which is a motion vector of a current block to be coded and specifies a reference block included in a reference picture; generating a prediction image block by allocating a value of an inside pixel to an outside pixel, the inside pixel being a pixel located inside an associated slice, the outside pixel being a pixel located outside the associated slice and included in the reference block specified by the current motion vector, and the associated slice being a slice included in the reference picture and corresponding to a current slice to be coded which includes the current block; subtracting the prediction image block from the current block to generate a difference image block; and coding the current motion vector and the difference image block.

Furthermore, it may be that the image coding method comprises storing, into a memory unit, identification information for identifying a range of the associated slice specified in each of reference pictures, and in the generating, the outside pixel and the inside pixel are determined by referring to the identification information stored in the memory unit, and the value of the inside pixel is allocated to the outside pixel to generate the prediction image block.

Furthermore, it may be that in the coding, the identification information is coded.

Furthermore, it may be that in the storing, the identification information is stored into the memory unit when the range of the associated slice has been changed.

Furthermore, it may be that in the coding, applicability information is coded, the applicability information indicating whether or not the value of the inside pixel is to be allocated to the outside pixel of the reference block, and in the generating, when the applicability information indicates that the value of the inside pixel is to be allocated to the outside pixel, the value of the inside pixel is allocated to the outside pixel of the reference block to generate the prediction image block.

Furthermore, it may be that the coding includes coding the applicability information indicating whether or not the value of the inside pixel is to be allocated to the outside pixel of the reference block which includes a boundary of the associated slice, and in the generating, when the applicability information indicates that the value of the inside pixel is to be allocated, the value of the inside pixel is allocated to the outside pixel of the reference block which includes the boundary of the associated slice, to generate the prediction image block.

Furthermore, it may be that the coding includes coding the applicability information indicating whether or not the value of the inside pixel is to be allocated to the outside pixel of the reference block which is entirely included in a non-associated slice different from the associated slice, and in the generating, when the applicability information indicates that the value of the inside pixel is to be allocated, the value of the inside pixel is allocated to the outside pixel of the reference block which is entirely included in the non-associated slice, to generate the prediction image block.

Furthermore, it may be that in the coding, an offset value for shifting the associated slice is coded, and in the generating, the associated slice is shifted by as much as the offset value, and the value of the inside pixel which is a pixel located inside the associated slice resulting from the shifting is allocated to the outside pixel which is a pixel located outside the associated slice resulting from the shifting, to generate the prediction image block.

Furthermore, it may be that in the generating, the value of the inside pixel which is a pixel spatially closest to the outside pixel among pixels included in the associated slice is allocated to the outside pixel, to generate the prediction image block.

Furthermore, an image decoding apparatus according to an aspect of the present invention may be an image decoding apparatus for decoding, on a per-block basis, pictures each including slices, the apparatus comprising: a decoding unit configured to decode a current motion vector and a difference image block, the current motion vector being a motion vector of a current block to be decoded and specifying a reference block included in a reference picture, and the difference image block indicating a difference between the current block and a prediction image block; a prediction image generation unit configured to generate the prediction image block by allocating a value of an inside pixel to an outside pixel, the inside pixel being a pixel located inside an associated slice, the outside pixel being a pixel located outside the associated slice and included in the reference block specified by the current motion vector, and the associated slice being a slice included in the reference picture and corresponding to a current slice to be decoded which includes the current block; and an addition unit configured to add up the difference image block and the prediction image block to reconstruct the current block.

Furthermore, an image coding apparatus according to an aspect of the present invention may be an image coding apparatus for coding, on a per-block basis, pictures each including slices, the apparatus comprising: a motion estimation unit configured to estimate a current motion vector which is a motion vector of a current block to be coded and specifies a reference block included in a reference picture; a prediction image generation unit configured to generate a prediction image block by allocating a value of an inside pixel to an outside pixel, the inside pixel being a pixel located inside an associated slice, the outside pixel being a pixel located outside the associated slice and included in the reference block specified by the current motion vector, and the associated slice being a slice included in the reference picture and corresponding to a current slice to be coded which includes the current block; a subtraction unit configured to subtract the prediction image block from the current block to generate a difference image block; and a coding unit configured to code the current motion vector and the difference image block.

Advantageous Effects of Invention

Using the present invention, a prediction image is appropriately generated even in the case where an image is divided into a plurality of slices. Thus, the decrease in image quality and the decrease in coding efficiency are reduced.

BRIEF DESCRIPTION OF DRAWINGS

FIG. 22 illustrates a structure of the multiplexed data.

FIG. 25 shows a structure of TS packets and source packets in the multiplexed data.

FIG. 33 shows an example of a look-up table in which standards of video data are associated with the driving frequencies.

FIG. 34A shows another example of a configuration for sharing a module of a signal processing unit.

DESCRIPTION OF EMBODIMENTS

Embodiments of the present invention are described below with reference to the drawings. It is to be noted that each of Embodiments described below illustrates one desirable specific example of the present invention. Numerical values, shapes, materials, structural elements, the arrangement and connection of the structural elements, steps, an order of the steps, and the like in the following Embodiments are an example of the present invention, and it should therefore not be construed that the present invention is limited to each of these Embodiments. Furthermore, out of the constituents in the following Embodiments, the constituents not stated in the independent claims describing the broadest concept of the present invention are described as given constituents in a more desirable embodiment.

(Embodiment 1)

Figure 1:
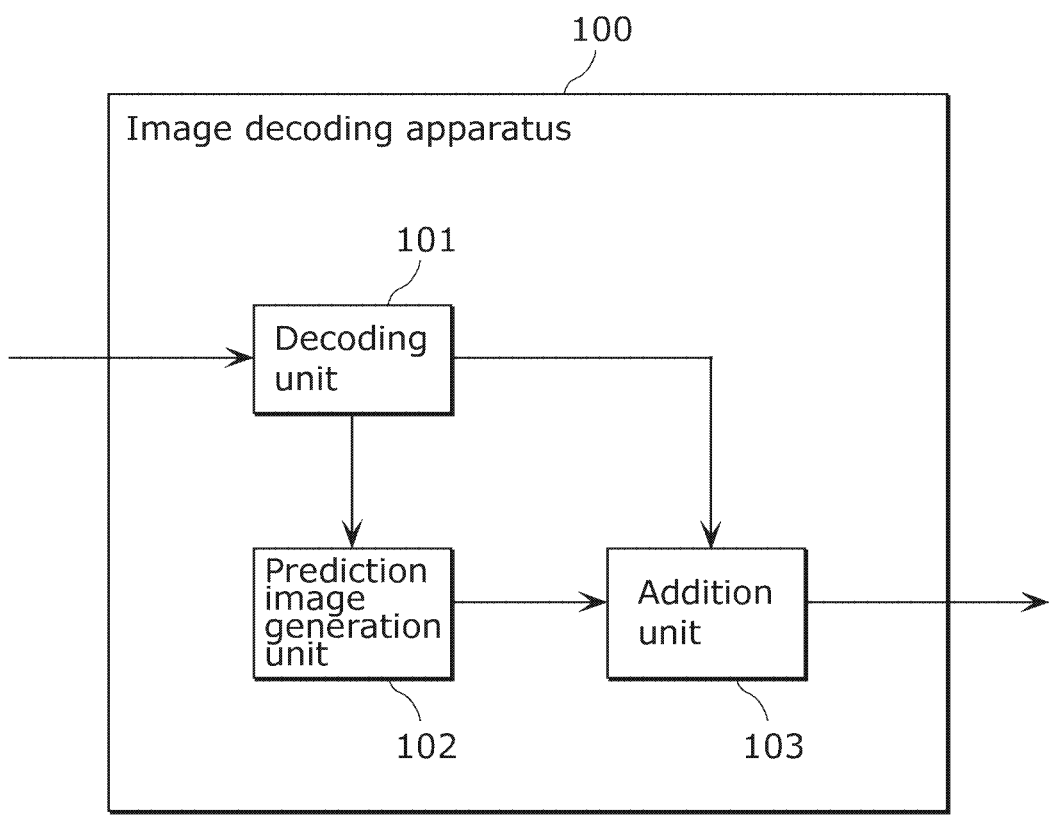
FIG. 1 is a structure diagram showing an image decoding apparatus according to Embodiment 1.

FIG. 1 is a structure diagram showing an image decoding apparatus according to this embodiment. An image decoding apparatus 100 shown in FIG. 1 decodes, on a per-block basis, pictures each including slices. Furthermore, the image decoding apparatus 100 includes a decoding unit 101, a prediction image generation unit 102, and an addition unit 103. A block herein is typically a macroblock, but may be a block which is measured in units different from the macroblock.

The decoding unit 101 decodes a motion vector (also referred to as a current motion vector) and a difference image block. The motion vector here is a motion vector of a current block to be decoded and is used to specify a reference block included in a reference picture. The difference image block here is a block generated in a coding process and made up of pixel values which indicate differences between pixel values of the current block and pixel values of a prediction image block. Typically, the decoding unit 101 performs variable-length decoding on the motion vector and the difference image block.

The prediction image generation unit 102 specifies a reference block in a reference picture using the motion vector and generates a prediction image block. At this time, the prediction image generation unit 102 performs pixel stretching at a slice boundary. Specifically, the prediction image generation unit 102 allocates a value of an inside pixel that is a pixel located inside an associated slice to an outside pixel that is a pixel located outside the associated slice and included in the reference block.

Here, the associated slice is a slice included in the reference picture and has identity with a current slice to be decoded which includes the current block. The current slice and the associated slice have video content (content) in common. Typically, the spatial position of the associated slice in the reference picture matches the spatial position of the current slice in the current picture. Alternatively, the area of the associated slice and the area of the current slice spatially overlap.

In other words, the associated slice is a slice which is included in the reference picture and corresponds to the current slice including the current block.

It is to be noted that the inside pixel may be located either inside or outside the reference block. As the value of the inside pixel, the prediction image generation unit 102 preferably allocates, to the outside pixel, a value of a pixel which is spatially closest to the outside pixel among the pixels included in the associated slice. Two pixels which are spatially close are likely to be similar to each other. Thus, the prediction image generation unit 102 is capable of improving prediction accuracy by allocating a spatially close pixel value.

The addition unit 103 adds up the difference image block decoded by the decoding unit 101 and the prediction image block generated by the prediction image generation unit 102. Specifically, the addition unit 103 adds up the pixel values included in the difference image block and the pixel values included in the prediction image block, thereby combining the difference image block and the prediction image block. By doing so, the addition unit 103 reconstructs the current block.

Figure 2:
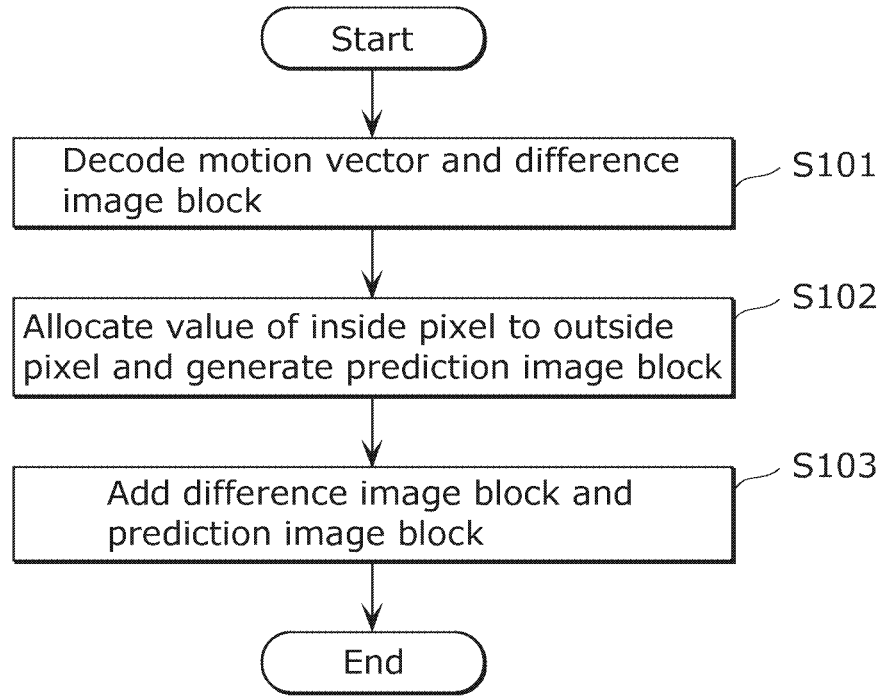
FIG. 2 is a flowchart showing an image decoding process according to Embodiment 1.

FIG. 2 is a flowchart showing an image decoding process according to the image decoding apparatus 100 shown in FIG. 1. First, the decoding unit 101 decodes the motion vector and the difference image block (S101). Next, the prediction image generation unit 102 allocates the value of the inside pixel to the outside pixel and generates the prediction image block (S102). Lastly, the addition unit 103 adds up the difference image block and the prediction image block (S103). By doing so, the current block is reconstructed.

Figure 3A:
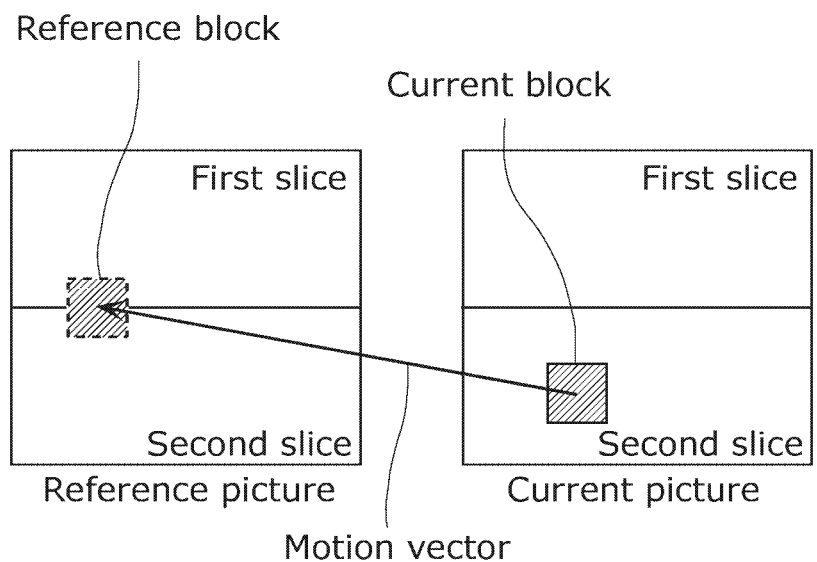
FIG. 3A is a conceptual diagram showing the first example of prediction image generation according to Embodiment 1.

FIG. 3A is a conceptual diagram showing the first example of prediction image generation according to this embodiment. In FIG. 3A, the current block is included in a second slice of the current picture. A motion vector of the current block points to the reference block located on the boundary between a first slice and the second slice in the reference picture. In this case, the prediction image generation unit 102 stretches a pixel in the second slice into the first slice.

Figure 3B:
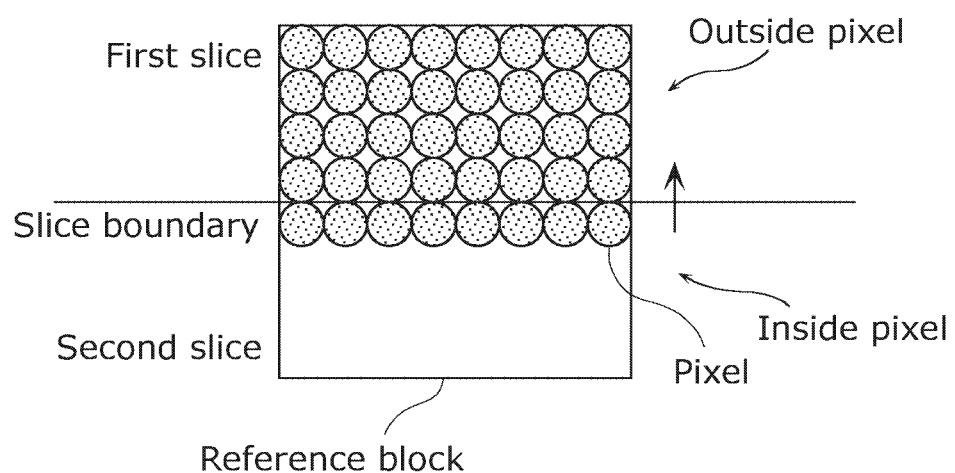
FIG. 3B is a conceptual diagram showing a stretching process according to Embodiment 1.

FIG. 3B is a conceptual diagram showing an example of a stretching process according to the prediction image generation shown in FIG. 3A. In FIG. 3B, a plurality of outside pixels and a plurality of inside pixels are shown. The outside pixels are included both in the first slice and in the reference block. The inside pixels are included both in the second slice and in the reference block. The prediction image generation unit 102 allocates, to each of the outside pixels, the value of one of the inside pixels which is closest to the outside pixel. By doing so, the prediction image generation unit 102 stretches a pixel in the second slice into the first slice.

Figure 4A:
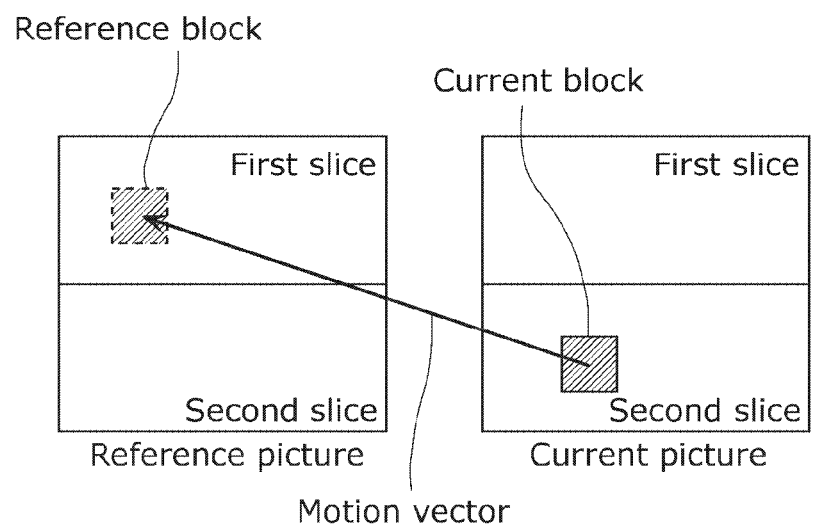
FIG. 4A is a conceptual diagram showing the second example of prediction image generation according to Embodiment 1.

FIG. 4A is a conceptual diagram showing the second example of prediction image generation according to this embodiment. In FIG. 4A, the current block is included in a second slice of the current picture as in the case of FIG. 3A. A motion vector of the current block points to the reference block. In FIG. 4A, a first slice of the reference picture includes the whole reference block. Also in this case, the prediction image generation unit 102 stretches a pixel in the second slice into the first slice.

Figure 4B:
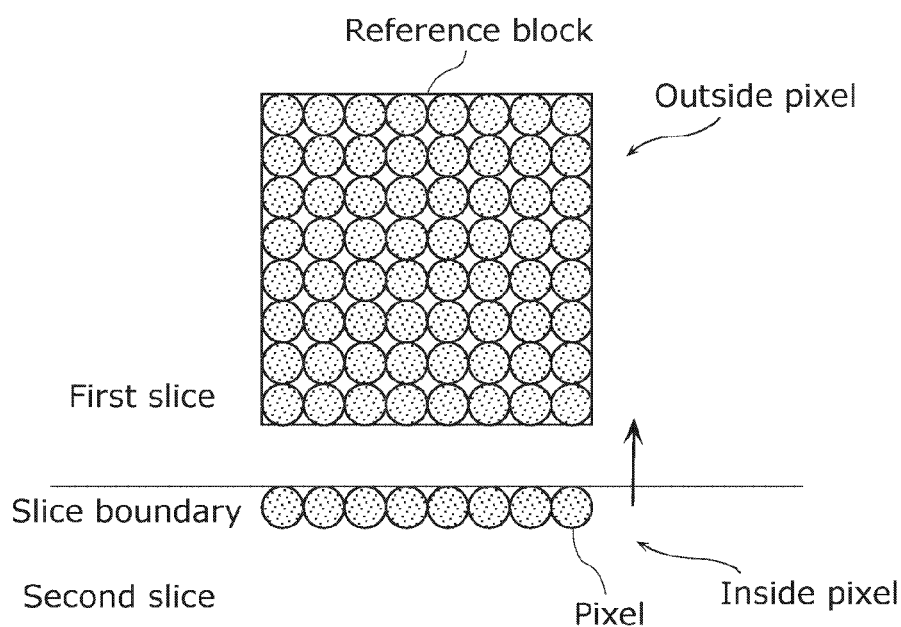
FIG. 4B is a conceptual diagram showing the second example of the stretching process according to Embodiment 1.

FIG. 4B is a conceptual diagram showing an example of a stretching process according to the prediction image generation shown in FIG. 4A. In FIG. 4B, a plurality of outside pixels and a plurality of inside pixels are shown. The outside pixels are included both in the first slice and in the reference block. In other words, all the pixels included in the reference block are outside pixels in FIG. 4B. The inside pixels are included in the second slice. In FIG. 4B, these inside pixels are not included in the reference block.

The prediction image generation unit 102 allocates, to each of the outside pixels, the value of one of the inside pixels which is closest to the outside pixel. By doing so, the prediction image generation unit 102 stretches a pixel in the second slice into the first slice.

Figure 5:
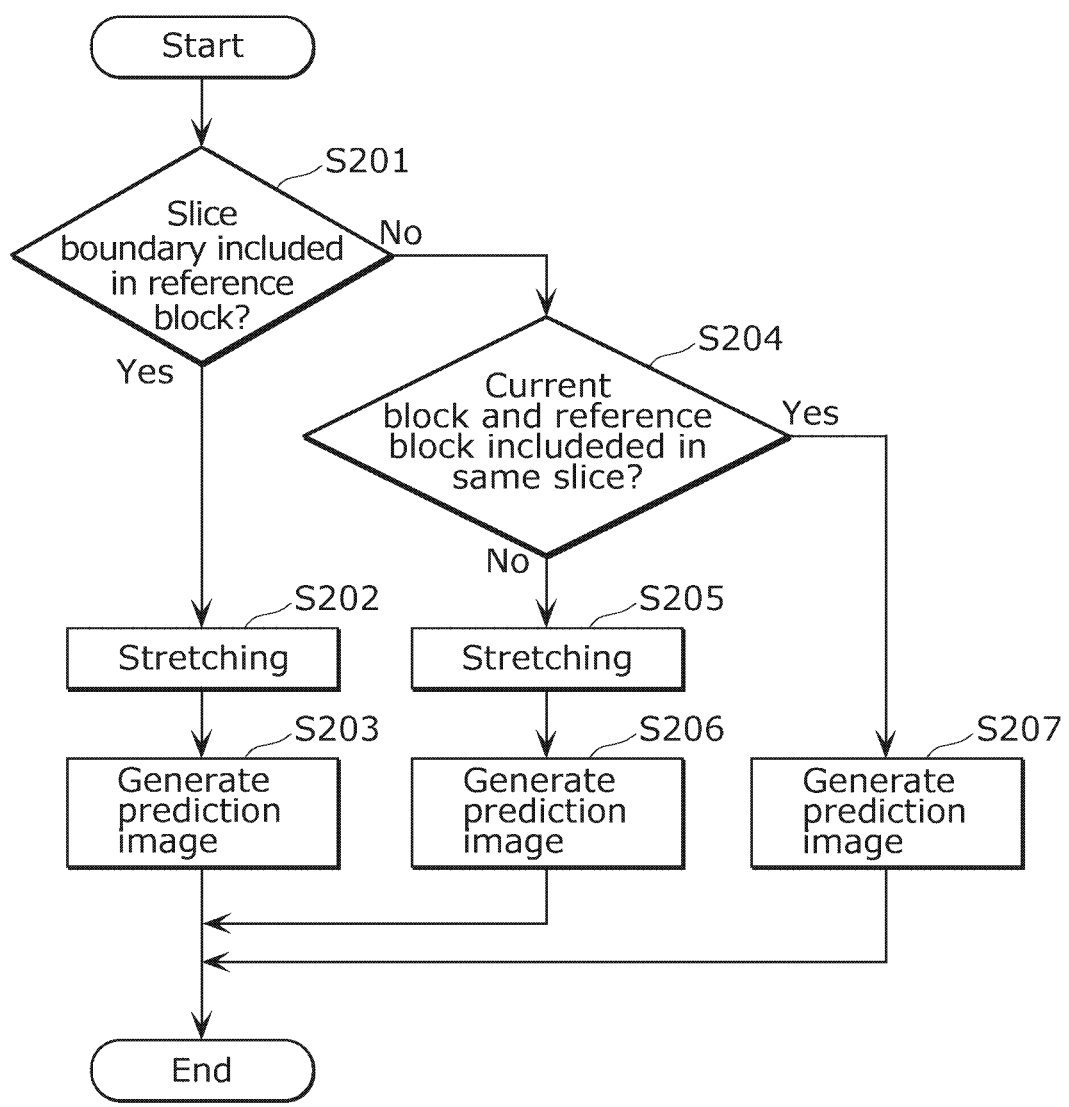
FIG. 5 is a flowchart showing a prediction image generation process according to Embodiment 1.

FIG. 5 is a flowchart showing a prediction image generation process according to the image decoding apparatus 100 shown in FIG. 1 and shows details of the prediction image generation process (S102) shown in FIG. 2.

First, the prediction image generation unit 102 checks a positional relationship between the reference block specified by the motion vector and the associated slice included in the reference picture. The associated slice is a slice which has identity with the current slice as described above.

When the reference block includes a boundary of the associated block (Yes in S201), the prediction image generation unit 102 performs a stretching process (S202). In this case, the prediction image generation unit 102 allocates a value of the inside pixel to the outside pixel as in the case of the stretching process shown in FIG. 3B. The prediction image generation unit 102 then generates a prediction image block (S203).

When the reference block does not include any boundary of the associated slice (No in S201) and the reference block and the current block are included in the same slice (Yes in S204), the prediction image generation unit 102 generates a prediction image block from the reference block without performing the stretching process (S207). It is to be noted that the same slice herein means a group of slices which are regarded as the same slice and include the current slice and the associated slice.

When the reference block does not include any boundary of the associated slice (No in S201) and the reference block and the current block are not included in the same slice (No in S204), the prediction image generation unit 102 performs the stretching process (S205). In this case, the prediction image generation unit 102 allocates a value of the inside pixel to the outside pixel as in the case of the stretching process shown in FIG. 4B. The prediction image generation unit 102 then generates a prediction image block (S206).

It is to be noted that the prediction image generation unit 102 may previously determine on a per-sequence basis, on a per-picture basis, on a per-slice basis, or on a per-block basis, whether or not such a stretching process is to be performed. When it has been previously determined that the stretching process is not to be performed, the prediction image generation unit 102 generates a prediction image block from the reference block without performing the stretching process (S202, S205).

For example, when the images on the respective slices have similar characteristics, referring to another slice has no problem, which means that the need for the stretching process is low. In such a case, the prediction image generation unit 102 may determine that the stretching process is not to be performed. By doing so, the processing efficiency improves.

Furthermore, such control on the stretching process may be applied only to the stretching process (S202) where the reference block includes a boundary as shown in FIG. 3B. Alternatively, the control on the stretching process may be applied only to the stretching process (S205) where the reference block is included in another slice as shown in FIG. 4B.

It is to be noted that the prediction image generation unit 102 may determine based on identification information whether or not the stretching process is to be performed.

Figure 6:
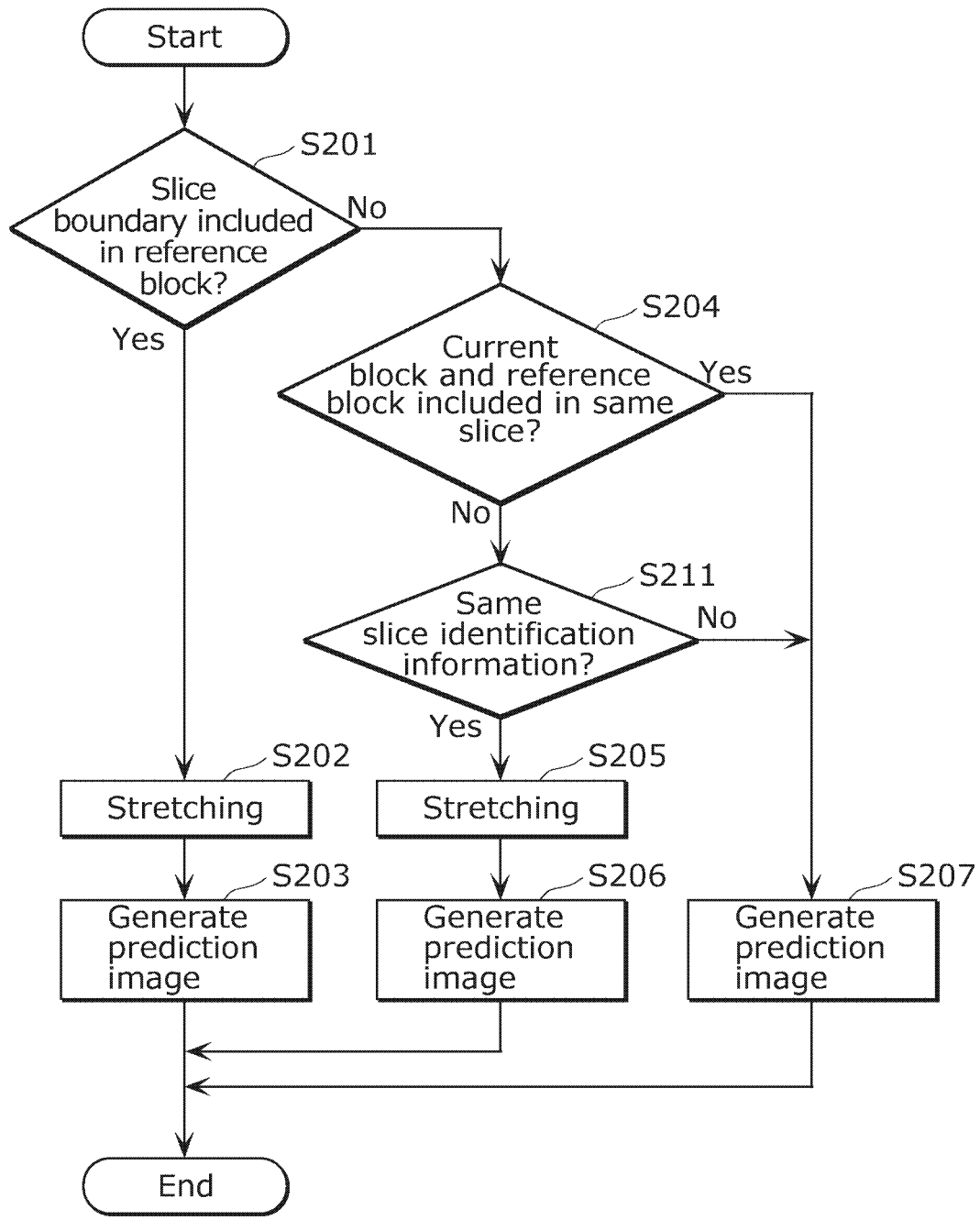
FIG. 6 is a flowchart showing a variation of the prediction image generation process according to Embodiment 1.

FIG. 6 is a flowchart showing a variation of the prediction image generation process shown in FIG. 5. The prediction image generation process of FIG. 6 additionally includes, as compared to FIG. 5, a process (S211) of determining whether or not slice identification information is the same.

In other words, when the reference block and the current block are not included in the same slice (No in S204), the prediction image generation unit 102 does not always have to perform the stretching process. When the reference block and the current block are not included in the same slice (No in S204), the prediction image generation unit 102 determines based on slice identification information whether or not the stretching process is to be performed. Here, the slice identification information is information which is allocated based on whether or not the images have continuity, how high the degree of similarity of the images is, and the like factor. The slice identification information may be coded.

When the slice identification information is the same (Yes in S211), the prediction image generation unit 102 performs the stretching process (S205). On the other hand, the slice identification information is not the same (No in S211), the prediction image generation unit 102 generates a prediction image bock from the reference block without performing the stretching process (S207).

For example, when the current slice and the associated slice have no image continuity, the prediction image generation unit 102 generates a prediction image block from the reference block without performing the stretching process. For example, when the current slice and the associated slice have a low level of similarity, the prediction image generation unit 102 generates a prediction image block from the reference block without performing the stretching process. By doing so, when the effect of the stretching process is low, the stretching process is less likely to take place. Thus, the prediction image generation process is performed efficiently.

In FIG. 6, when the reference block and the current block are not included in the same slice (No in S204), the prediction image generation unit 102 determines whether or not the slice identification information is the same. However, also when the reference block includes a boundary of the associated slice (S201), the prediction image generation unit 102 may determine whether or not the slice identification information is the same. Subsequently, the prediction image generation unit 102 may perform the stretching process only when the slice identification information is the same. By doing so, the prediction image generation process becomes more efficient likewise.

Furthermore, on the basis of a result of the determination made in a coding process on whether or not the stretching process is to be performed, the image decoding apparatus 100 may determine whether or not the stretching process is to be performed. For example, the decoding unit 101 decodes applicability information which is information determined and coded in the coding process and indicating whether or not the value of the inside pixel is to be allocated to the outside pixel of the reference block. The prediction image generation unit 102 then allocates the value of the inside pixel to the outside pixel of the reference block only when the applicability information indicates that the value of the inside pixel is to be allocated to the outside pixel.

Thus, the stretching process is controlled based on a result of the determination made in the coding process. The applicability information may be information for controlling the stretching process which is performed on the reference block including a boundary of the associated slice. Furthermore, the applicability information may be information for controlling the stretching process which is performed on the reference block which is entirely included in a non-associated slice different from the associated slice.

Figure 7A:
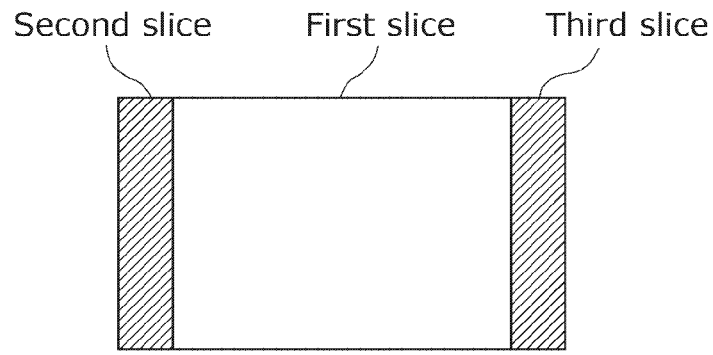
FIG. 7A is a conceptual diagram showing the first example of a slice structure according to Embodiment 1.

FIG. 7A is a conceptual diagram showing the first example of a slice structure according to this embodiment. In FIG. 7A, a first slice, a second slice, and a third slice are included in a picture. For example, a typical aspect ratio of standard definition (SD) video is 4:3. Meanwhile, a typical aspect ratio of high definition (HD) video is 16:9. Accordingly, mapping SD video on HD video results in the picture shown in FIG. 7A based on a difference in aspect ratio.

The first slice at the middle in FIG. 7A is a region for displaying primary video. The second slice on the left and the third slice on the right are regions in which, basically, no video is displayed, but which are represented in a single color, black. However, subtitles or accompanying information on the video may be displayed. Thus, these regions are coded separately from the first slice for displaying the primary video.

When the stretching process is not performed at a slice boundary, differences in image characteristics may decrease the image quality especially around the boundary between the first slice and the second slice and around the boundary between the first slice and the third slice. Such a decrease in image quality is reduced by the above-described stretching process. In particular, when pixels included in the first slice and located around boundaries are stretched into the second slice on the left and the third slice on the right, the image quality of the video which is displayed around the boundaries of the first slice improves.

Figure 7B:
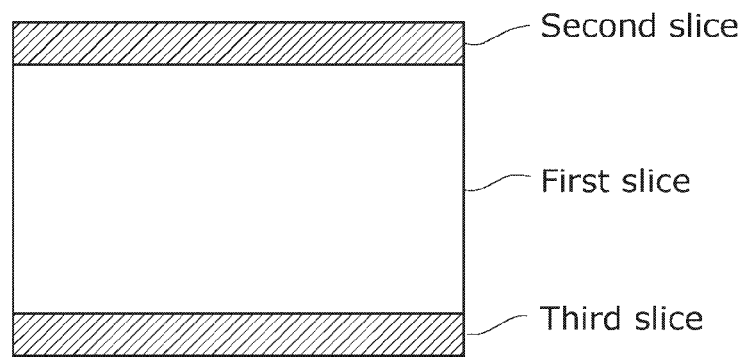
FIG. 7B is a conceptual diagram showing the second example of the slice structure according to Embodiment 1.

FIG. 7B is a conceptual diagram showing the second example of the slice structure according to this embodiment. FIG. 7B shows the example where HD video is mapped on SD video. The first slice at the middle is a region for displaying primary video. The second slice at the top and the third slice at the bottom are regions in which, basically, no video is displayed, but which are represented in a single color, black. Also in this case, the stretching process reduces a decrease in the image quality around the boundary between the first slice and the second slice and around the boundary between the first slice and the third slice.

Figure 7C:
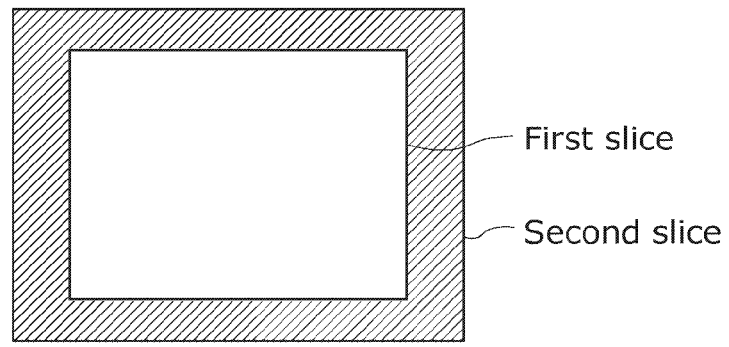
FIG. 7C is a conceptual diagram showing the third example of the slice structure according to Embodiment 1.

FIG. 7C is a conceptual diagram showing the third example of the slice structure according to this embodiment. As shown in FIG. 7C, a lacking number of pixels contained in video content may lead to the layout in which, as the first slice, the video content is located at the middle and, as the second slice, solid black video is located around the video content. Also in this case, the stretching process reduces a decrease in the image quality around the boundary between the first slice and the second slice.

Figure 8A:
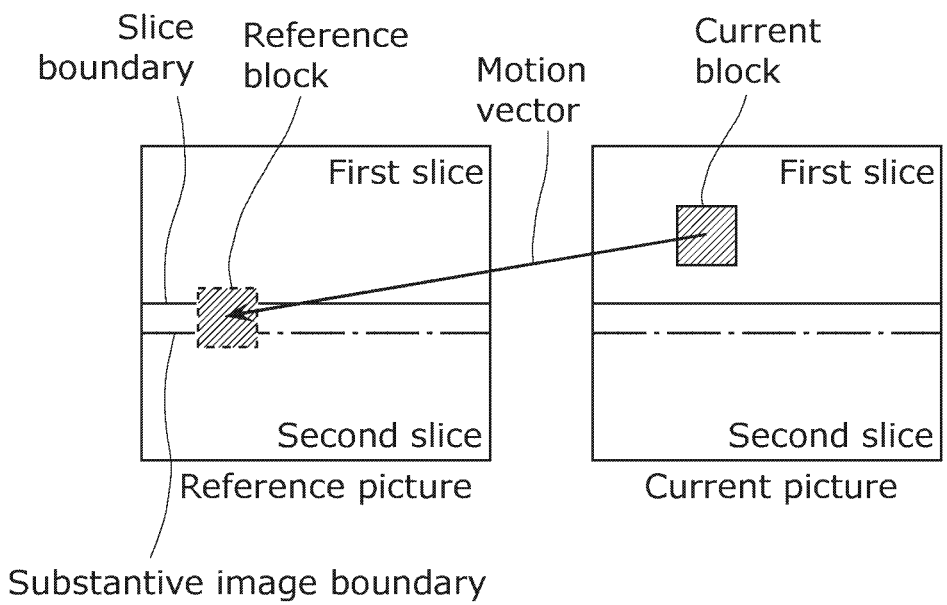
FIG. 8A is a conceptual diagram showing the third example of prediction image generation according to Embodiment 1.

FIG. 8A is a conceptual diagram showing the third example of prediction image generation according to this embodiment. In FIG. 8A, the current block is included in a first slice of the current picture. A motion vector of the current block points to the reference block located on the boundary between the first slice and a second slice in the reference picture. In FIG. 8A, there is a gap between a slice boundary and a substantive image boundary.

The substantive image boundary is, for example, a boundary between the region which is represented in a single color, black, and the region in which primary video is displayed, as shown in FIG. 7A, etc. It is not necessarily the case that the image including the plurality of regions as shown in FIG. 7A, etc. is precisely divided into blocks each of which is the minimum unit of processing. For example, a macroblock of 16 by 16 pixels may be located across both the region which is represented in a single color, black, and the region in which primary video is displayed. In addition, a slice, which depends on the region of a block, is located across the two regions.

Thus, there may be a gap between a slice boundary and a substantive image boundary. The prediction image generation unit 102 may perform the stretching process according to such a gap.

Figure 8B:
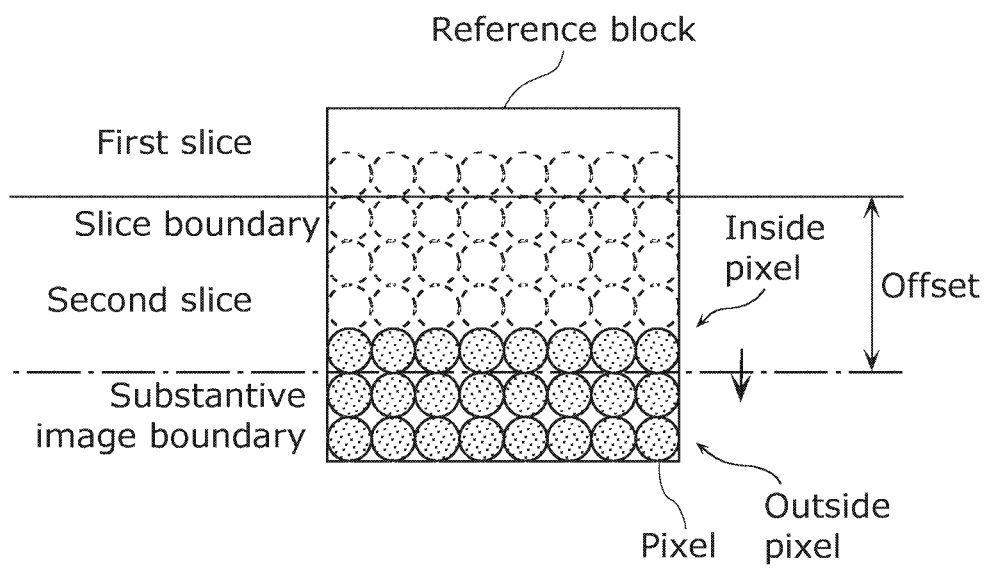
FIG. 8B is a conceptual diagram showing the third example of the stretching process according to Embodiment 1.

FIG. 8B is a conceptual diagram showing an example of the stretching process according to the prediction image generation shown in FIG. 8A. The prediction image generation unit 102 shifts the slice boundary based on an offset value indicating a difference between the slice boundary and the substantive image boundary.

The decoding unit 101 may obtain the offset value by decoding the offset value determined in the coding process. Alternatively, the prediction image generation unit 102 may determine the offset value in the same or the like manner as the method of determining the offset value in the coding process. For example, the prediction image generation unit 102 may detect an edge portion of the reference picture as the substantive image boundary to determine the offset value.

Here, when the offset value is positive, the prediction image generation unit 102 shifts the first slice, which is the associated slice, in a direction such that the first slice is enlarged. When the offset value is negative, the prediction image generation unit 102 shifts the first slice, which is the associated slice, in a direction such that the first slice is shrunk. It goes without saying that the relationship between the plus and minus of the offset value and the shift direction may be reversed.

The prediction image generation unit 102 then allocates a value of an inside pixel to an outside pixel. The outside pixel here is a pixel located outside the associated slice resulting from the shifting. The inside pixel here is a pixel located inside the associated slice resulting from the shifting. Thus, the prediction image generation unit 102 generates a prediction image block by performing the stretching process according to the gap.

Figures 9A, 9B:
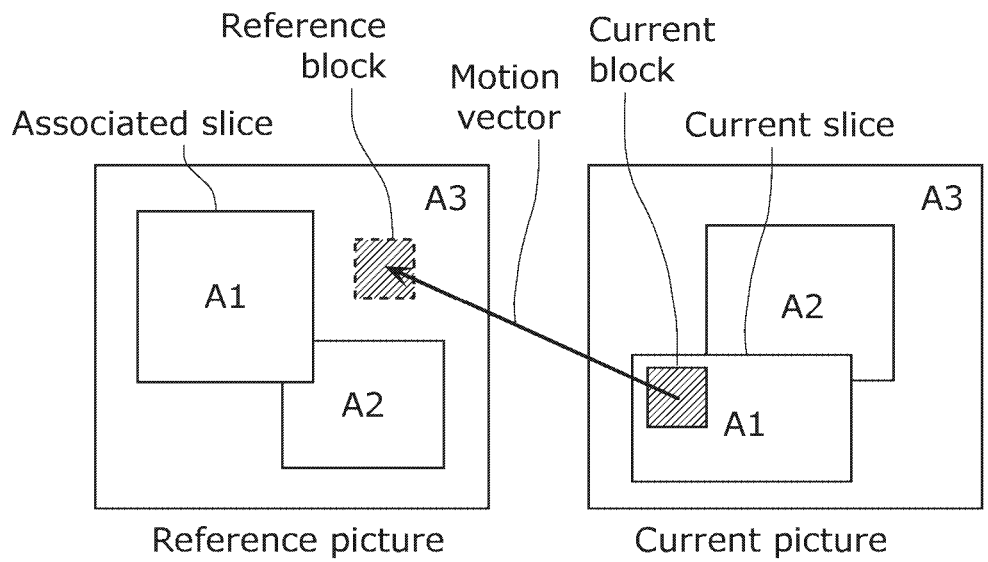
FIG. 9A is a conceptual diagram showing the fourth example of prediction image generation according to Embodiment 1.
FIG. 9B is a conceptual diagram showing an example of identification information according to Embodiment 1.

FIG. 9A is a conceptual diagram showing the fourth example of prediction image generation according to this embodiment. This shows an example where a plurality of regions for displaying a plurality of video images is included in a single picture and the position and size of each of the regions change depending on the picture. For example, in the case of a personal computer or the like, a plurality of display regions appear on a screen, and each of the display regions may change. FIG. 9A shows the example in such a case.

The current picture and the reference picture in FIG. 9A each include three slices A1, A2, and A3 which correspond to three respective display regions. The slice A1 of the current picture is the current slice and includes the current block. A motion vector of the current block points to the reference block of the reference picture.

In such a case, the prediction image generation unit 102 stretches, into the reference block, a pixel in the slice A1 which is the associated slice in the reference picture. However, the prediction image generation unit 102 needs to recognize the range of the slice A1 in the reference picture.

Otherwise, the prediction image generation unit 102 fails to determine which pixel in the reference picture is to be stretched. Furthermore, unless whether or not the reference block is included in the slice A1 is recognized, the prediction image generation unit 102 fails to determine whether or not the stretching process is necessary.

The image decoding apparatus 100 may therefore include a storage unit which stores, into a memory unit, identification information for identifying the range of the associated slice which is specified in each of the pictures. With this, the prediction image generation unit 102 is capable of determining an outside pixel and an inside pixel by referring to the identification information stored in the memory unit.

The identification information may include information on the slice boundary. Furthermore, the identification information may include identification information for identifying a specific slice from among a plurality of slices included in a picture.

Furthermore, the image decoding apparatus 100 may obtain the identification information from the coding apparatus. For example, the decoding unit 101 decodes identification information coded on a per-picture basis in the coding process. The storage unit of the image decoding apparatus 100 stores the decoded identification information into the memory unit. Thus, by referring to the identification information stored in the memory unit, the prediction image generation unit 102 is capable of specifying an associated slice which is associated with the current slice.

The frequency of change of the slice range is assumed to be relatively low. Thus, it may be that the storage unit of the image decoding apparatus 100 stores the identification information into the memory unit only when the range of the associated slice has been changed. Furthermore, it may be that the decoding unit 101 decodes the coded identification information only when the range of the associated slice has been changed.

Furthermore, it may be that the decoding unit 101 first decodes an identification signal indicating whether or not there is a change, and decodes a more detailed signal only when there is a change. By doing so, the decoding unit 101 is capable of decoding a coded stream for which an increase in code amount has been reduced.

Furthermore, as to whether or not slice identification information is included, it may be that the decoding unit 101 refers to information indicated in upper-layer header information of the slice (i.e., the information indicating whether or not identification information is included) and performs a decoding process on the identification information only when the identification information is included. By doing so, it is possible to reduce the process load of the decoding unit 101.

FIG. 9B is a conceptual diagram showing an example of the identification information according to the prediction image generation shown in FIG. 9A. The identification information shown in FIG. 9B includes information indicating which slice includes each pixel. Such identification information is stored into the memory unit in association with each picture. With this, the range of the associated slice is identified.

It is to be noted that FIG. 9B is an example of a structure of the identification information and the structure of the identification information is not limited to the example of FIG. 9B. For example, the identification information may include information for specifying a slice on a per-specific-range basis instead of per-pixel basis.

Figure 10:
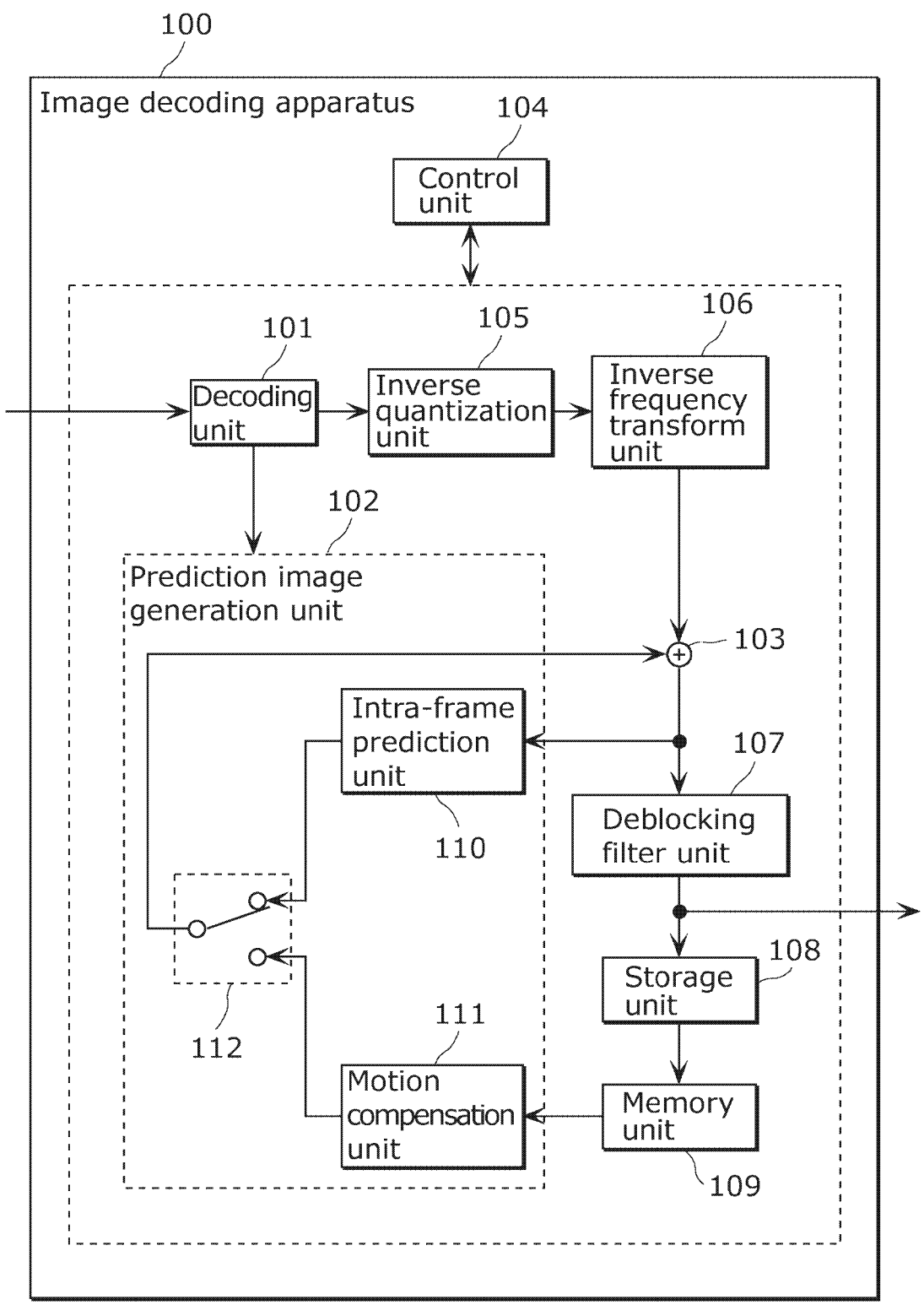
FIG. 10 is a structure diagram showing a specific example of the image decoding apparatus according to Embodiment 1.

FIG. 10 is a structure diagram showing a specific example of the image decoding apparatus 100 shown in FIG. 1. The image decoding apparatus 100 includes a control unit 104, a decoding unit 101, an inverse quantization unit 105, an inverse frequency transform unit 106, an addition unit 103, a deblocking filter unit 107, a storage unit 108, a memory unit 109, and a prediction image generation unit 102. The prediction image generation unit 102 includes an intra-frame prediction unit 110, a motion compensation unit 111, and a switch unit 112.

The control unit 104 controls the whole image decoding apparatus 100. The decoding unit 101 decodes, from the coded stream, a motion vector and a difference image block made up of frequency coefficient values.

The inverse quantization unit 105 inversely quantizes the difference image block. The inverse frequency transform unit 106 performs inverse frequency transform on the inversely-quantized difference image block. The addition unit 103 adds up the difference image block and a prediction image block, thereby reconstructing the current block.

The deblocking filter unit 107 removes block artifacts of the current block. The storage unit 108 stores the current block into the memory unit 109. The memory unit 109 is a memory unit for holding a reference picture.

The intra-frame prediction unit 110 generates a prediction image block by intra-frame prediction. The motion compensation unit 111 generates a prediction image block by inter-frame prediction. The switch unit 112 selectively switches between the intra-frame prediction and the inter-frame prediction under control of the control unit 104.

Figure 11:
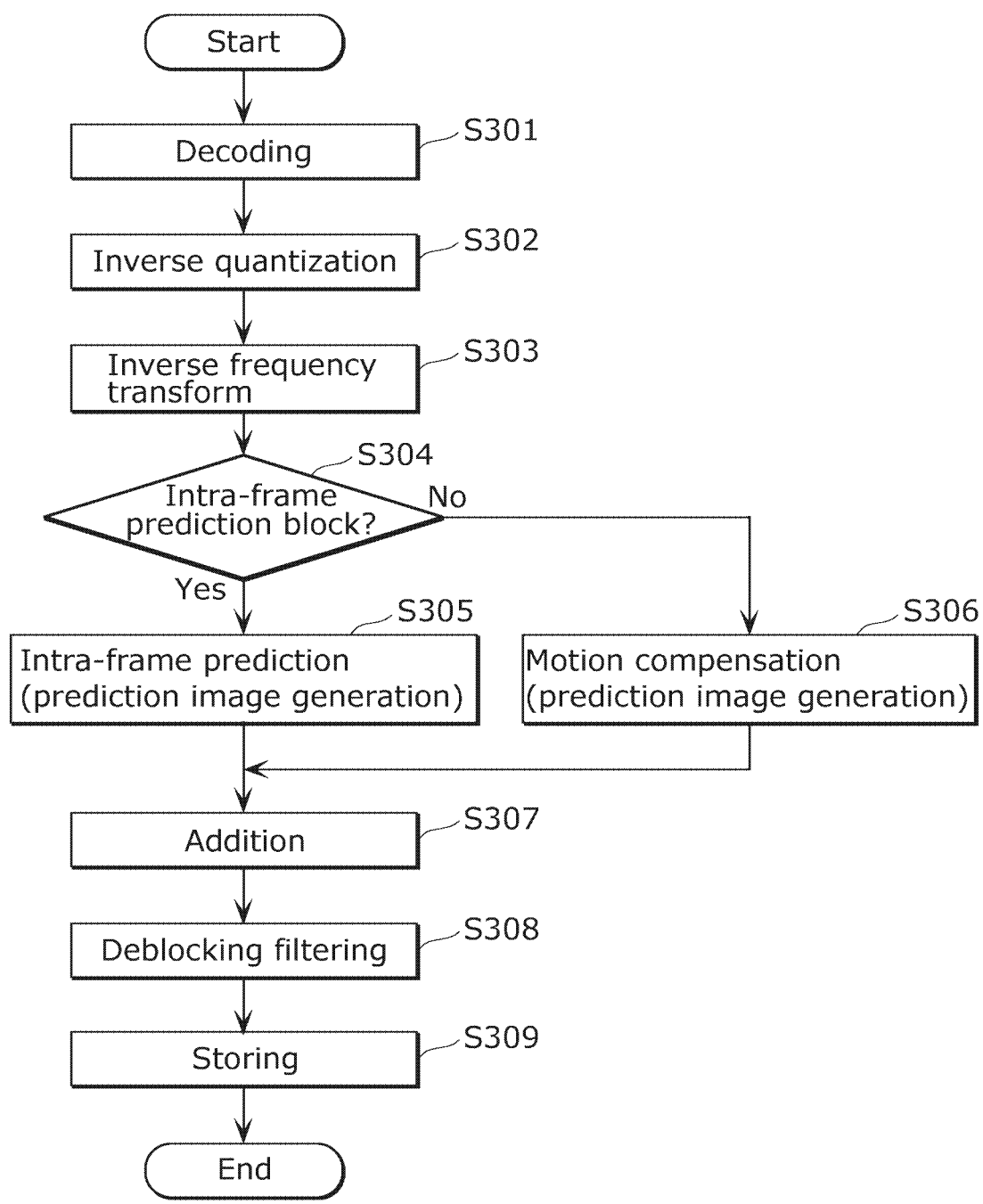
FIG. 11 is a flowchart showing a specific example of the image decoding process according to Embodiment 1.

FIG. 11 is a flowchart showing a specific example of an image decoding process according to the image decoding apparatus 100 shown in FIG. 10. First, the decoding unit 101 decodes, from the coded stream, the motion vector and the difference image block for the current block (S301). At this time, the decoding unit 101 may decode identification information for identifying the range of each slice.

It may be that, only when the range of a slice has been changed, does the coded stream include the identification information for identifying the range of the slice. In this case, only when the range of the slice has been changed, does the decoding unit 101 decode the identification information for identifying the range of the slice. Furthermore, the decoding unit 101 may decode applicability information indicating whether or not the value of the inside pixel that is a pixel located inside the associated block is to be allocated to the outside pixel that is a pixel located outside the associated block.

Next, the inverse quantization unit 105 inversely quantizes the difference image block obtained by the decoding unit 101 (S302). Next, the inverse frequency transform unit 106 performs inverse frequency transform on the difference image block resulting from the inverse quantization (S303). In other words, using the difference image block made up of frequency coefficient values, the inverse frequency transform unit 106 generates a difference image block made up of pixel values.

Next, the control unit 104 determines whether or not the current block is an intra-frame prediction block that is decoded by intra-frame prediction (S304). When the current block is an intra-frame prediction block (Yes in S304), the intra-frame prediction unit 110 generates a prediction image block by intra-frame prediction (S305).

On the other hand, when the current block is not the intra-frame prediction block (No in S304), that is, when the current block is an inter-frame prediction block, the motion compensation unit 111 generates a prediction image block by inter-frame prediction (S306). At this time, the motion compensation unit 111 performs motion compensation by referring to at least one reference picture stored in the memory unit 109.

Furthermore, at this time, the motion compensation unit 111 generates a prediction image block by allocating the value of the inside pixel that is a pixel located inside the associated block corresponding to the current slice, to the outside pixel that is a pixel located outside the associated block. Furthermore, the motion compensation unit 111 may refer to the identification information stored in the memory unit 109 to identify the range of the associated slice and determine the outside pixel and the inside pixel. Moreover, the motion compensation unit 111 may change the control on the pixel stretching process based on the applicability information.

Next, the addition unit 103 adds up the difference image block and the prediction image block (S307). By doing so, the addition unit 103 reconstructs the current block. The deblocking filter unit 107 then removes block artifacts of the current block (S308).

Next, the storage unit 108 stores, into the memory unit 109, the current block processed by the deblocking filter unit 107 (S309). The storage unit 108 sequentially stores the current blocks, thereby storing a plurality of pictures as a plurality of reference pictures into the memory unit 109.

Here, the storage unit 108 may store, into the memory unit 109, the identification information for identifying the range of the associated slice which is specified in each of the reference pictures. The identification information may be identification information decoded by the decoding unit 101. Furthermore, it may be that the storage unit 108 stores the identification information into the memory unit 109 only when the range of the associated slice has been changed.

Furthermore, it may be that an independent identification information storage unit separate from the storage unit 108 stores the identification information into an independent identification information memory unit separate from the memory unit 109. This means that the identification information may be handled separately from the reference picture. In addition, the identification information storage unit may be included in the control unit 104.

Through the above processing, the image decoding apparatus 100 generates a prediction image by allocating the value of the inside pixel that is a pixel located inside the associated slice, to the outside pixel that is a pixel located outside the associated slice. By doing so, even in the case where an image is divided into a plurality of slices, a prediction image is appropriately generated, resulting in reduction in the decrease in image quality.

An image coding apparatus according to this embodiment includes similar structural elements which correspond to the structural elements of the image decoding apparatus 100 according to this embodiment. The image coding apparatus according to this embodiment performs similar processing which corresponds to the processing performed by the image decoding apparatus 100 according to this embodiment. By doing so, the image coding apparatus according to this embodiment is capable of coding an image including a plurality of slices while reducing both a decrease in image quality and a decrease in coding efficiency.

Figure 12:
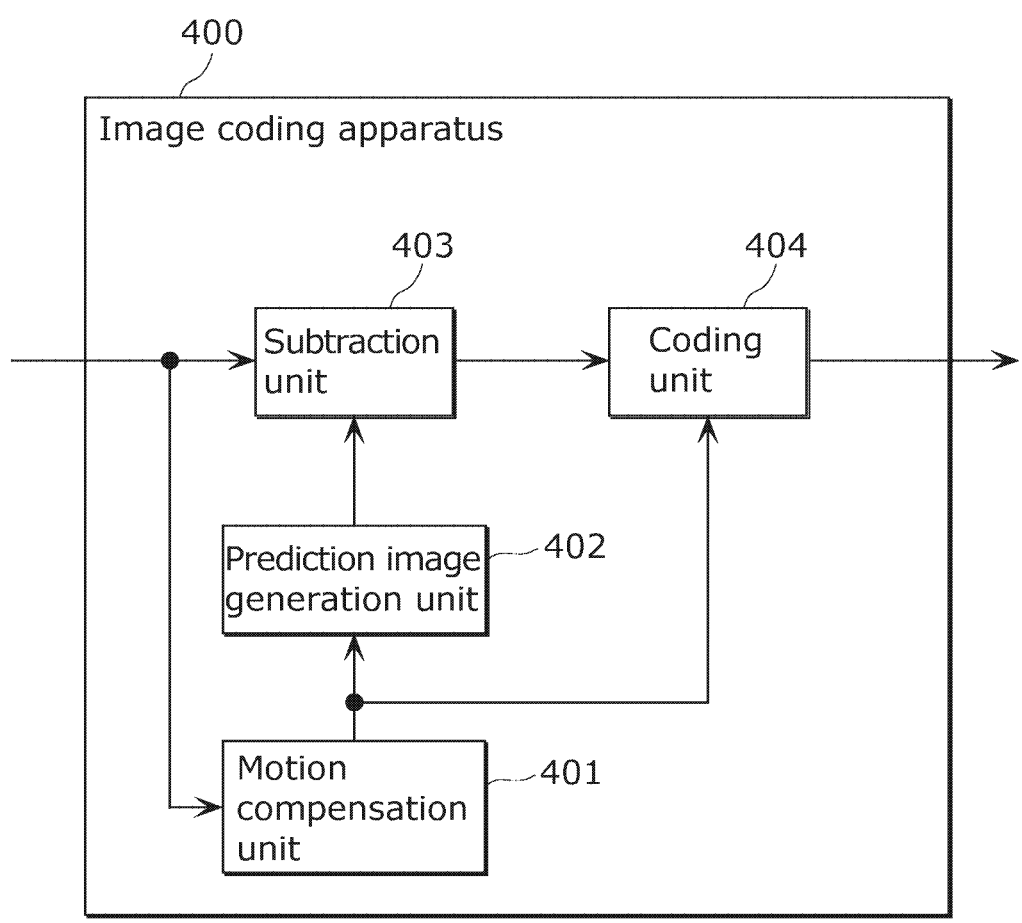
FIG. 12 is a structure diagram showing an image coding apparatus according to Embodiment 1.

FIG. 12 is a structure diagram showing the image coding apparatus according to this embodiment. An image coding apparatus 400 shown in FIG. 12 codes, on a per-block basis, pictures each including slices. The image coding apparatus 400 includes a motion estimation unit 401, a prediction image generation unit 402, a subtraction unit 403, and a coding unit 404.

The motion estimation unit 401 estimates a motion vector (also referred to as a current motion vector). The motion vector here is a motion vector of a current block to be coded and is used to specify a reference block included in a reference picture.

The prediction image generation unit 402 specifies a reference block in a reference picture using the motion vector and generates a prediction image block. At this time, the prediction image generation unit 402 performs pixel stretching at a slice boundary as in the case of the prediction image generation unit 102 in the decoding process. Specifically, the prediction image generation unit 402 allocates a value of an inside pixel that is a pixel located inside an associated slice to an outside pixel that is a pixel located outside the associated slice and included in the reference block.

Here, the associated slice is a slice included in the reference picture and has identity with a current slice to be coded which includes the current block. The current slice and the associated slice have video content (content) in common. Typically, the spatial position of the associated slice in the reference picture matches the spatial position of the current slice in the current picture. Alternatively, the area of the associated slice and the area of the current slice spatially overlap.

In other words, the associated slice is a slice which is included in the reference picture and corresponds to the current slice including the current block.

The subtraction unit 403 subtracts the prediction image block from the current block, thereby generating a difference image block. Specifically, the subtraction unit 403 subtracts the pixel values included in the prediction image block from the pixel values included in the current block, thereby generating the difference image block.

The coding unit 404 codes the motion vector estimated by the motion estimation unit 401 and the difference image block generated by the subtraction unit 403. Typically, the coding unit 404 performs variable-length coding on the motion vector and the difference image block.

Figure 13:
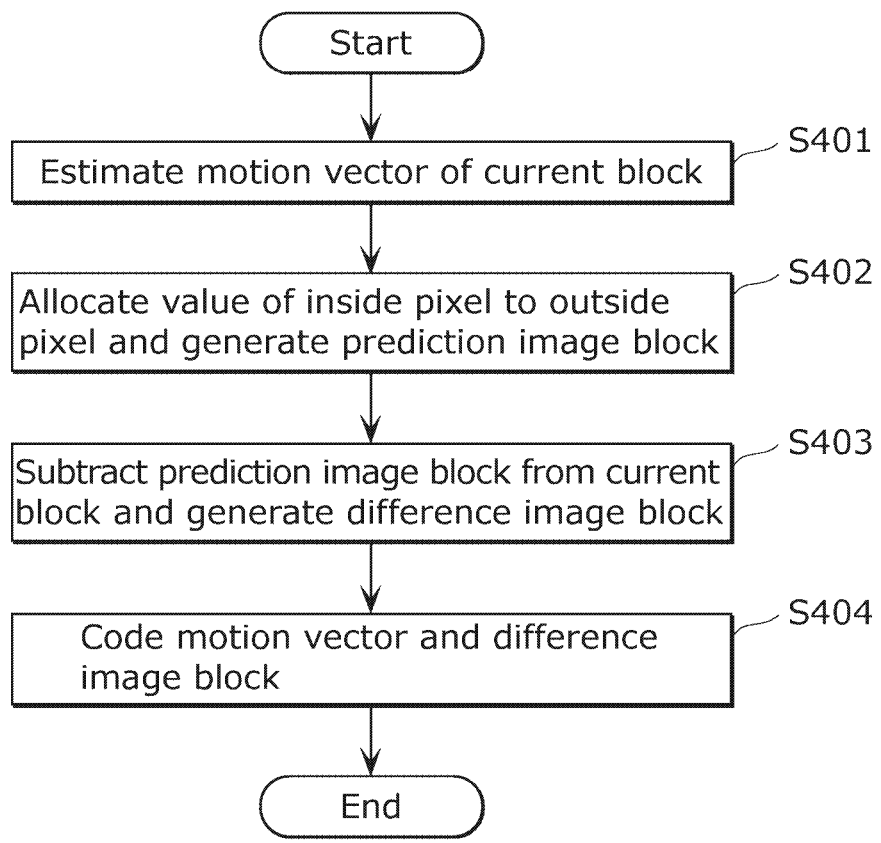
FIG. 13 is a flowchart showing an image coding process according to Embodiment 1.

FIG. 13 is a flowchart showing an image coding process according to the image coding apparatus 400 shown in FIG. 12.

First, the motion estimation unit 401 estimates the motion vector of the current block (S401). Next, the prediction image generation unit 402 allocates the value of the inside pixel to the outside pixel and generates the prediction image block (S402). Next, the subtraction unit 403 subtracts the prediction image block from the current block, thereby generating the difference image block (S403). Lastly, the coding unit 404 codes the motion vector and the difference image block (S404). By doing so, the current block is coded.

Figure 14:
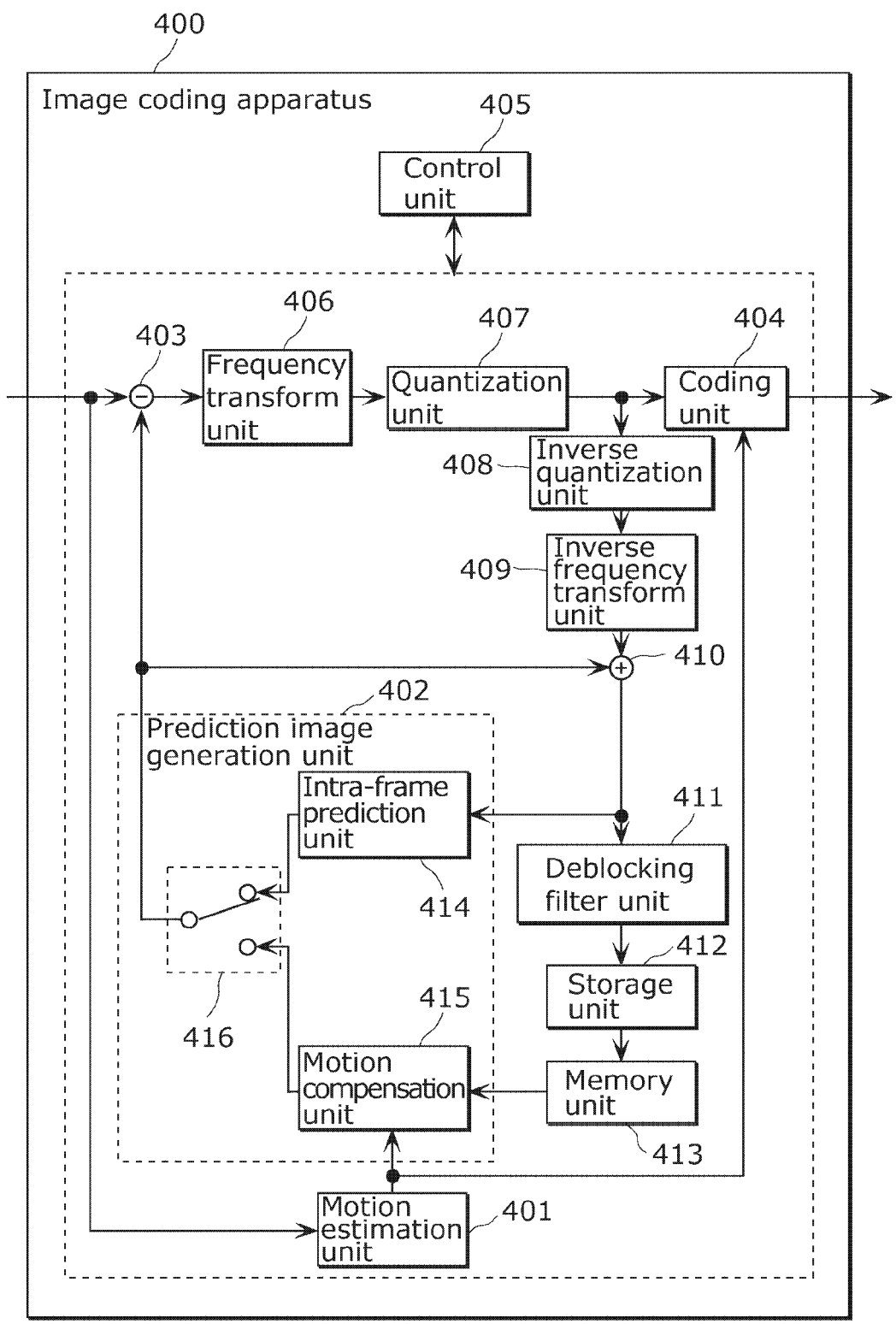
FIG. 14 is a structure diagram showing a specific example of an image coding apparatus according to Embodiment 1.

FIG. 14 is a structure diagram showing a specific example of the image coding apparatus 400 shown in FIG. 12. The image coding apparatus 400 shown in FIG. 14 includes a control unit 405, the motion estimation unit 401, the subtraction unit 403, a frequency transform unit 406, a quantization unit 407, the coding unit 404, an inverse quantization unit 408, an inverse frequency transform unit 409, an addition unit 410, a deblocking filter unit 411, a storage unit 412, a memory unit 413, and the prediction image generation unit 402. The prediction image generation unit 402 includes an intra-frame prediction unit 414, a motion compensation unit 415, and a switch unit 416.

The control unit 405 controls the whole image coding apparatus 400. The motion estimation unit 401 estimates the motion vector of the current block included in an input image. The subtraction unit 403 subtracts the prediction image block from the current block, thereby generating the difference image block.

The frequency transform unit 406 transforms the difference image block made up of pixel values into the difference image block made up of frequency coefficient values. The quantization unit 407 quantizes the difference image block made up of frequency coefficient values. The coding unit 404 codes the motion vector and the quantized difference image block.

The inverse quantization unit 408 inversely quantizes the quantized difference image block. The inverse frequency transform unit 409 performs inverse frequency transform on the inversely-quantized difference image block, thereby generating a difference image block made up of pixel values. The addition unit 410 adds up the difference image block and the prediction image block, thereby generating a reconstructed image block approximate to the original version of the current block.

The deblocking filter unit 411 removes block artifacts of the reconstructed image block. The storage unit 412 stores the reconstructed image block into the memory unit 413. The memory unit 413 is a memory unit for holding a reference picture.

The intra-frame prediction unit 414 generates a prediction image block by intra-frame prediction. The motion compensation unit 415 generates a prediction image block by inter-frame prediction. The switch unit 416 selectively switches between the intra-frame prediction and the inter-frame prediction under control of the control unit 405.

Figure 15:
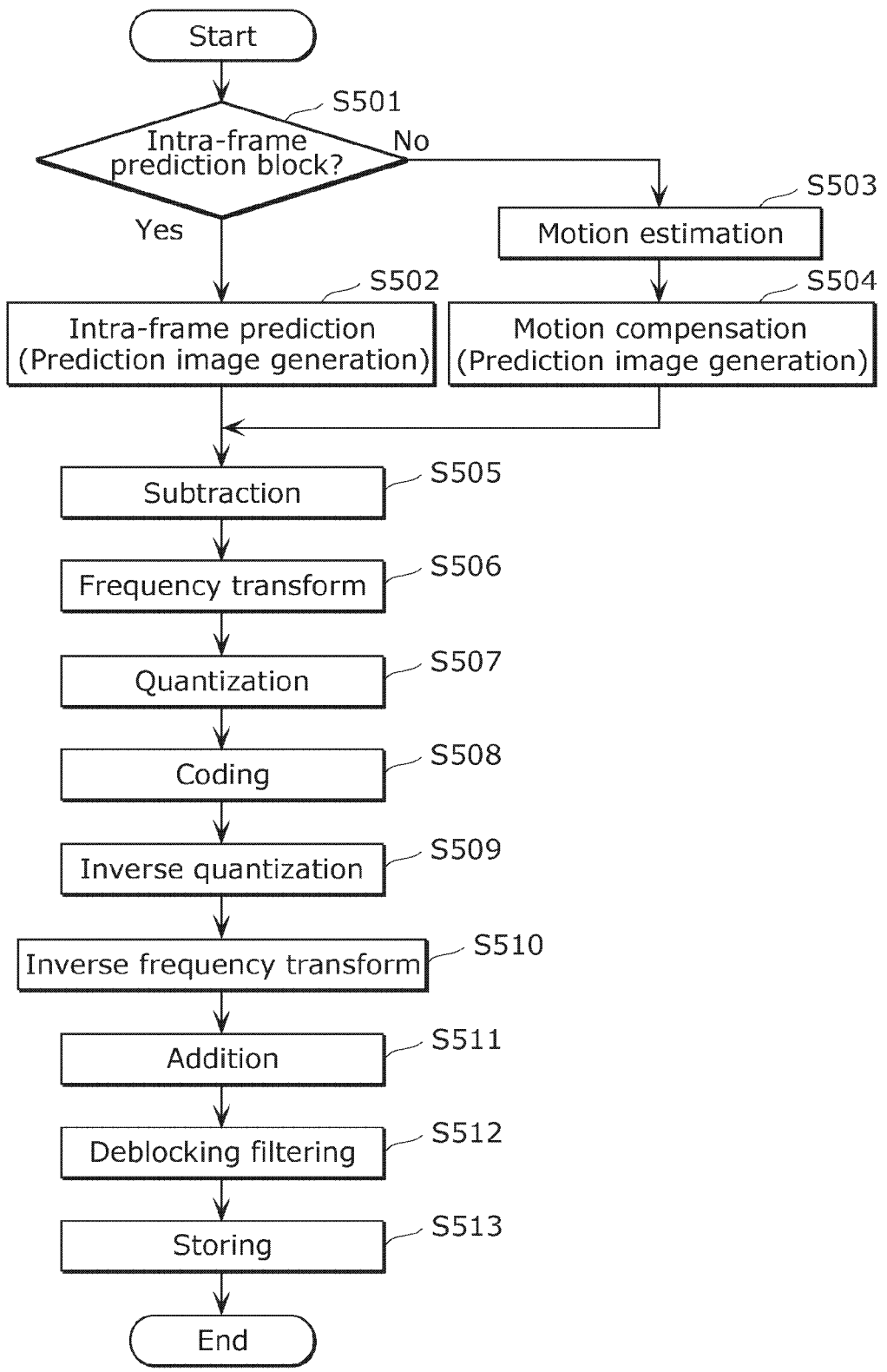
FIG. 15 is a flowchart showing a specific example of the image coding process according to Embodiment 1.

FIG. 15 is a flowchart showing a specific example of an image coding process according to the image coding apparatus 400 shown in FIG. 14. First, the control unit 405 determines whether or not the current block in an input image is an intra-frame prediction block that is coded by intra-frame prediction (S501). When the current block is an intra-frame prediction block (Yes in S501), the intra-frame prediction unit 414 generates a prediction image block by intra-frame prediction (S502).

On the other hand, when the current block is not the intra-frame prediction block (No in S501), that is, when the current block is an inter-frame prediction block, the motion estimation unit 401 estimates the motion vector of the current block (S503). The motion compensation unit 415 then generates a prediction image block by inter-frame prediction (S504). At this time, the motion compensation unit 415 performs motion compensation by referring to at least one reference picture stored in the memory unit 413.

Furthermore, at this time, the motion compensation unit 415 generates a prediction image block by allocating the value of the inside pixel that is a pixel located inside the associated block corresponding to the current slice, to the outside pixel that is a pixel located outside the associated block. Furthermore, the motion compensation unit 415 may refer to the identification information stored in the memory unit 413 to identify the range of the associated slice and determine the outside pixel and the inside pixel.

Moreover, the motion compensation unit 415 may change the control on the pixel stretching process based on applicability information indicating whether or not the value of the inside pixel is to be allocated to the outside pixel. In this case, the control unit 405 may determine whether or not the value of the inside pixel is to be allocated to the outside pixel, and generate the applicability information to be used by the motion compensation unit 415.

Next, the subtraction unit 403 subtracts the prediction image block from the current block, thereby generating the difference image block (S505). The frequency transform unit 406 then transforms the difference image block made up of pixel values into the difference image block made up of frequency coefficient values (S506). Subsequently, the quantization unit 407 quantizes the difference image block made up of frequency coefficient values (S507).

Next, the coding unit 404 codes the quantized difference image block, thereby generating a coded stream (S508). At this time, when the current block is an inter-prediction block, the coding unit 404 codes the motion vector. Furthermore, the coding unit 404 may code identification information for identifying the range of each slice. Moreover, it may be that, only when the range of a slice has been changed, does the coding unit 404 code identification information for identifying the range of the slice.

Here, as is explained on the operation in the decoding process, it may be that, as the identification information, the slice identification information is allocated based on whether or not the images have continuity, how high the degree of similarity of the images is, and the like factor. Accordingly, the stretching process is not performed on slices having the same characteristics, but is performed only on slices having different characteristics or on a boundary of such slices. Thus, the coding efficiency improves.

Furthermore, the coding unit 404 may code applicability information indicating whether or not the value of the inside pixel is to be allocated to the outside pixel.

Next, the inverse quantization unit 408 inversely quantizes the quantized difference image block (S509). The inverse frequency transform unit 409 performs inverse frequency transform on the inversely-quantized difference image block. In other words, using the difference image block made up of frequency coefficient values, the inverse frequency transform unit 409 generates a difference image block made up of pixel values (S510).

Next, the addition unit 410 adds up the difference image block and the prediction image block (S511). By doing so, the addition unit 410 generates a reconstructed image block. The deblocking filter unit 411 removes block artifacts from the reconstructed image block (S512).

Next, the storage unit 412 stores, into the memory unit 413, the reconstructed image block processed by the deblocking filter unit 411 (S513). The storage unit 412 sequentially stores the reconstructed image blocks, thereby storing a plurality of pictures as a plurality of reference pictures into the memory unit 413.

Here, the storage unit 412 may store, into the memory unit 413, the identification information for identifying the range of the associated slice which is specified in each of the reference pictures. Furthermore, it may be that, only when the range of the associated slice has been changed, the storage unit 412 stores the identification information into the memory unit 413.

Furthermore, it may be that an independent identification information storage unit separate from the storage unit 412 stores the identification information into an independent identification information memory unit separate from the memory unit 413. This means that the identification information may be handled separately from the reference picture. In addition, the identification information storage unit may be included in the control unit 405.

Through the above processing, the image coding apparatus 400 is capable of appropriately generating a prediction image even in the case where an image is divided into a plurality of slices. It is to be noted that the above explanation describes representative processing of the image coding apparatus 400. The image coding apparatus 400 is capable of performing not only the above-described processing, but also processing similar to the processing performed by the image decoding apparatus 100. For example, the image coding apparatus 400 is capable of performing the processing shown in FIGS. 3A to 9B.

As above, the image decoding apparatus 100 and the image coding apparatus 400 according to this embodiment each generate a prediction image by allocating the value of the inside pixel that is a pixel located inside the associated slice, to the outside pixel that is a pixel located outside the associated slice. By doing so, the prediction accuracy improves. Thus, even in the case where an image is divided into a plurality of slices, a prediction image is appropriately generated, resulting in reduction in the decrease in image quality and in the decrease in coding efficiency.

Although the prediction image is generated from a single reference picture in the above description, the prediction image may be generated from a plurality of reference pictures. Also in this case, the image decoding apparatus 100 and the image coding apparatus 400 are each capable of generating a prediction image block by allocating the value of the inside pixel to the outside pixel in the same or like manner.

Furthermore, the coding unit 404 of the image coding apparatus 400 may code the motion vector by coding the motion vector difference obtained by subtracting the prediction motion vector from the motion vector. In this case, the decoding unit 101 of the image decoding apparatus 100 decodes the motion vector by decoding the motion vector difference and adding up the decoded motion vector difference and the prediction motion vector. Here, the prediction motion vector is a motion vector predicted based on a motion vector of a block adjacent to the current block.

Although the above describes the image decoding apparatus and the image coding apparatus according to an implementation of the present invention have been described base on the embodiment, the present invention is not limited to the embodiment. The present invention includes an embodiment with some modifications on the embodiment that are conceived by a person skilled in the art, and another embodiment obtained through any combinations of the structural elements in the embodiment.

For example, the process performed by a specific processing unit may be performed by another processing unit. Furthermore, the sequence of performing the processes may be changed, and a plurality of processes may be performed in parallel.

Furthermore, the image decoding apparatus and the image coding apparatus according to an implementation of the present invention may be provided as an image coding and decoding apparatus which includes any combination of the structural elements of the image decoding apparatus and the image coding apparatus. For example, the image coding and decoding apparatus according to an implementation of the present invention may include, as an image decoding unit, the image decoding apparatus according to an implementation of the present invention and further include, as an image coding unit, the image coding apparatus according to the implementation of the present invention.

Furthermore, the present invention can be implemented not only as the image decoding apparatus and the image coding apparatus, but also as a method which includes, as steps, the processing means included in the image decoding apparatus and the image coding apparatus. For example, these steps are performed by a computer. In addition, the present invention can be implemented as a program which causes a computer to perform the steps included in the method. Furthermore, the present invention can be implemented as a non-transitory computer-readable recording medium such as a compact disc read-only memory (CD-ROM) on which the program has been recorded.

Furthermore, the structural elements included in the image decoding apparatus and the image coding apparatus may be implemented in the form of large scale integration (LSI) that is an integrated circuit. These structural elements may be each provided on a single chip, and part or all of them may be formed into a single chip. For example, the structural elements other than the memory unit may be formed into a single chip. The name used here is LSI, but it may also be called an integral circuit (IC), system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The structural elements included in the image decoding apparatus and the image coding apparatus can be integrated using such a technology.

(Embodiment 2)

The processing described in the above embodiment can be simply implemented in an independent computer system, by recording, in a recording medium, a program for implementing the configuration of the moving picture coding method (the image coding method) or the moving picture decoding method (the image decoding method) described in the above embodiment. The recording media may be any recording media as long as the program can be recorded, such as a magnetic disk, an optical disk, a magnetic optical disk, an IC card, and a semiconductor memory.

Hereinafter, the applications to the moving picture coding method (the image coding method) and the moving picture decoding method (the image decoding method) described in the above embodiment and systems using them will be described. This system is characterized by including an image coding and decoding apparatus composed of the image coding apparatus using the image coding method and the image decoding apparatus using the image decoding method. The other structure of the system can be appropriately changed depending on situations.

Figure 16:
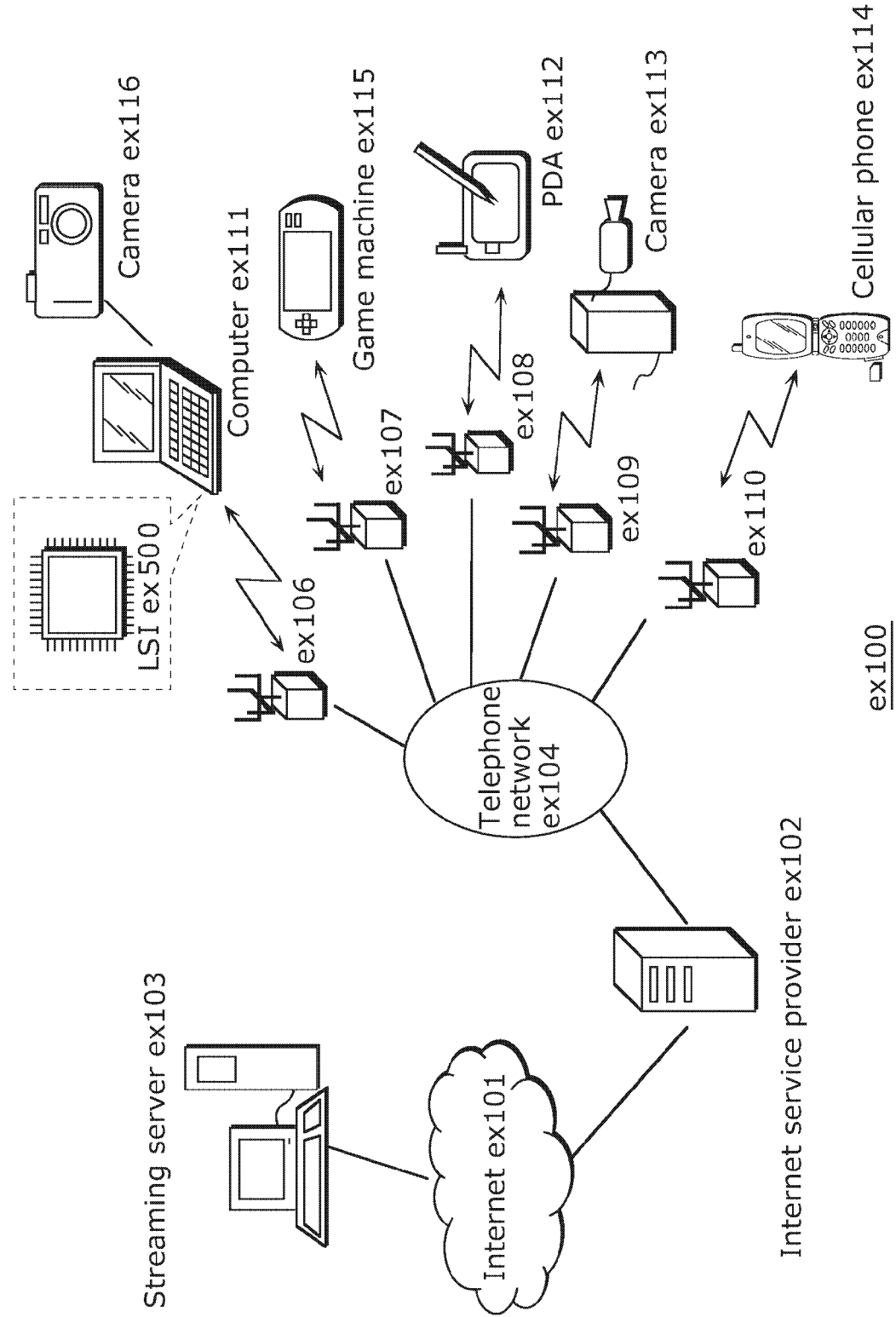
FIG. 16 illustrates an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described in the above embodiment (that is, the system functions as the image coding apparatus according to an implementation of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the received data (that is, the system functions as the image decoding apparatus according to the implementation of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be synthesized into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
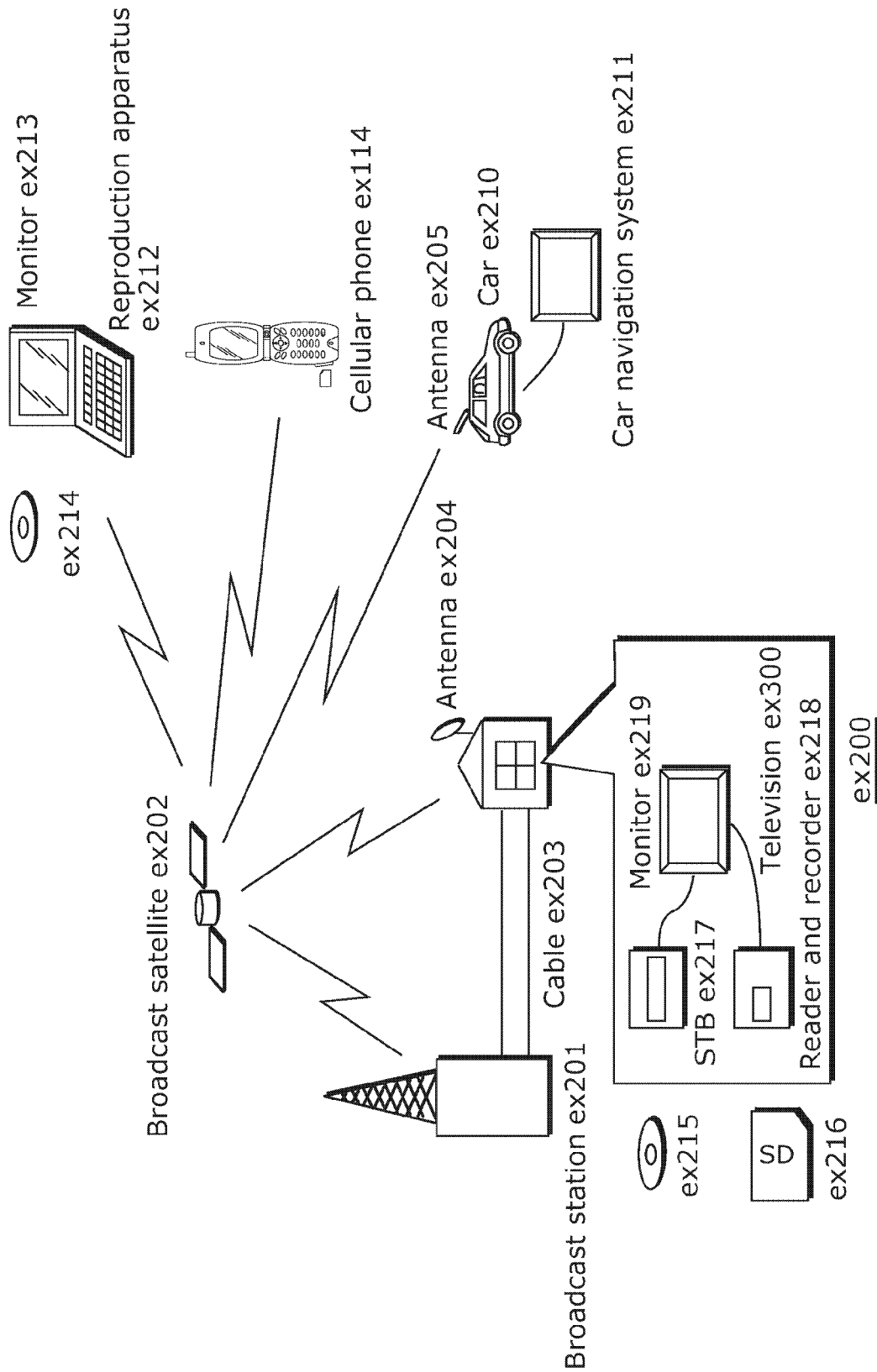
FIG. 17 illustrates an overall configuration of a digital broadcasting system.

Aside from the example of the content providing system ex100, at least one of the moving picture coding apparatus (the image coding apparatus) and the moving picture decoding apparatus (the image decoding apparatus) described in the above embodiment may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in the above embodiment (that is, the video data is data coded by the image coding apparatus according to an implementation of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (that is, the system functions as the image decoding apparatus according to an implementation of the present invention).

Furthermore, a reader/recorder ex218 (i) reads and decodes the multiplexed data recorded on a recording media ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in the above embodiment. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
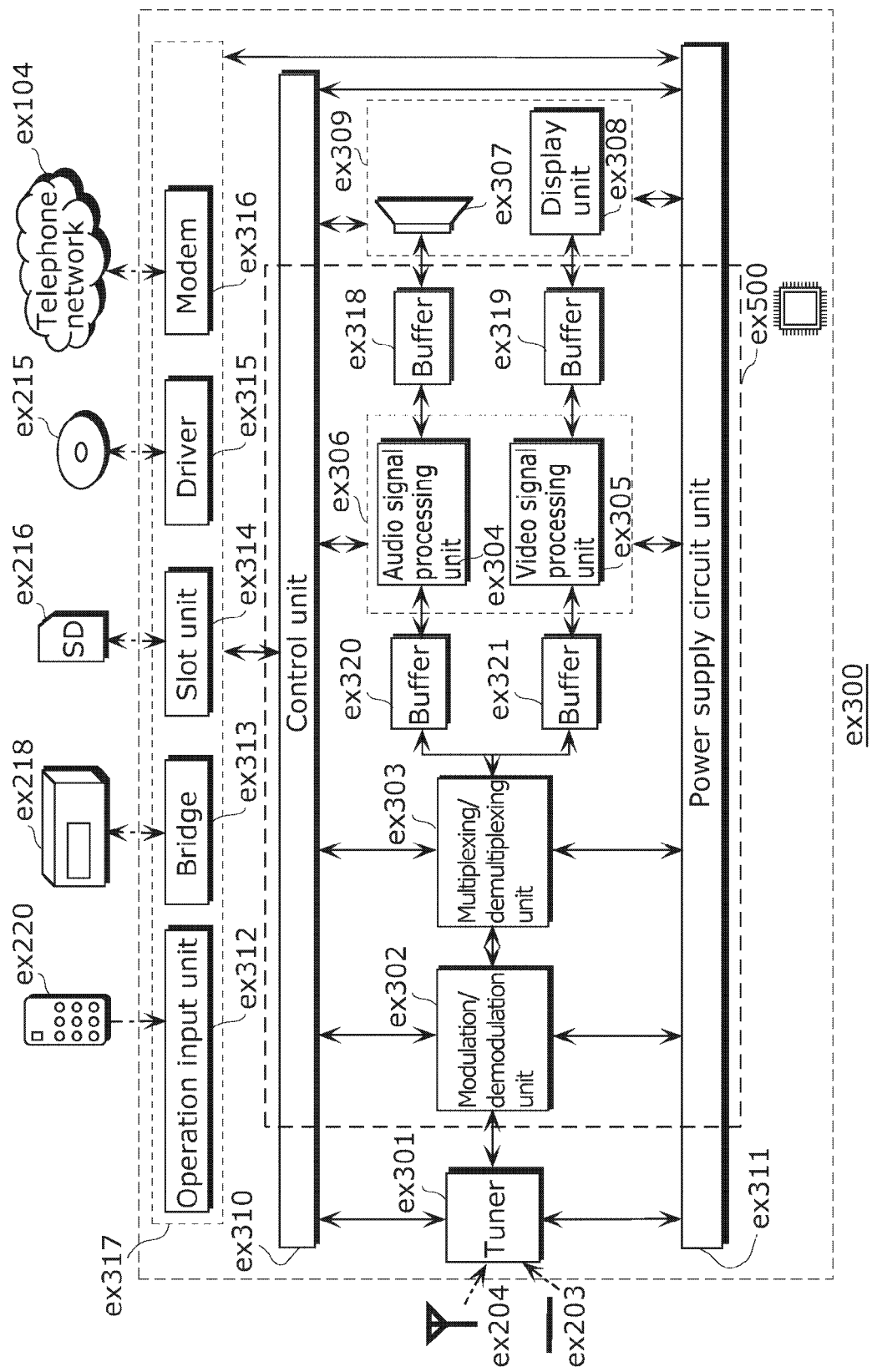
FIG. 18 is a block diagram illustrating an example of a configuration of a television.

FIG. 18 illustrates the television (receiver) ex300 that uses the moving picture coding method and the moving picture decoding method described in the above embodiment. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

Furthermore, the television ex300 further includes: a signal processing unit ex306 including an audio signal processing unit ex304 and a video signal processing unit ex305 (functioning as the image coding apparatus or the image decoding apparatus according to an implementation of the present invention) that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in the above embodiment, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in the above embodiment. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrated, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
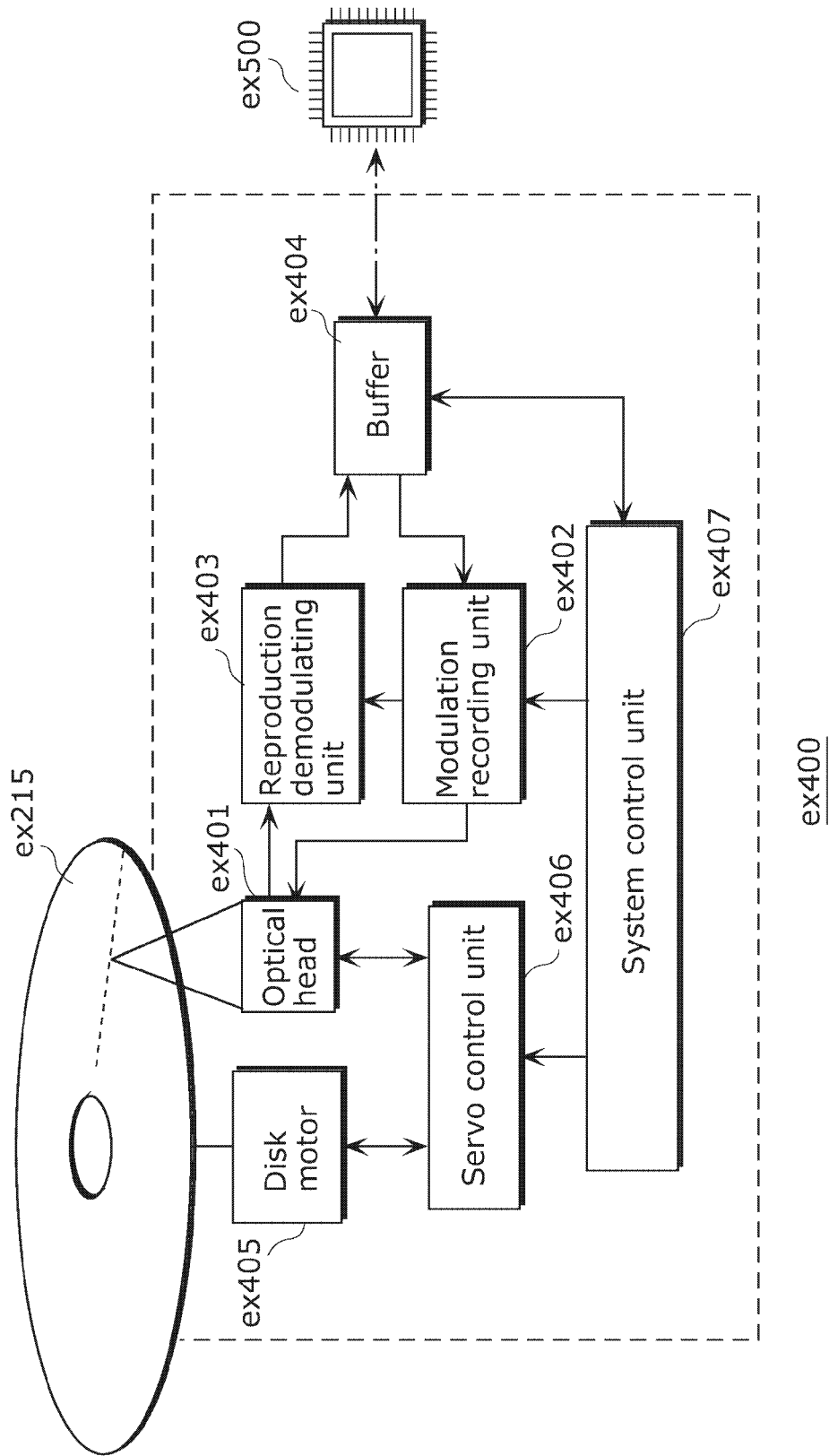
FIG. 19 is a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
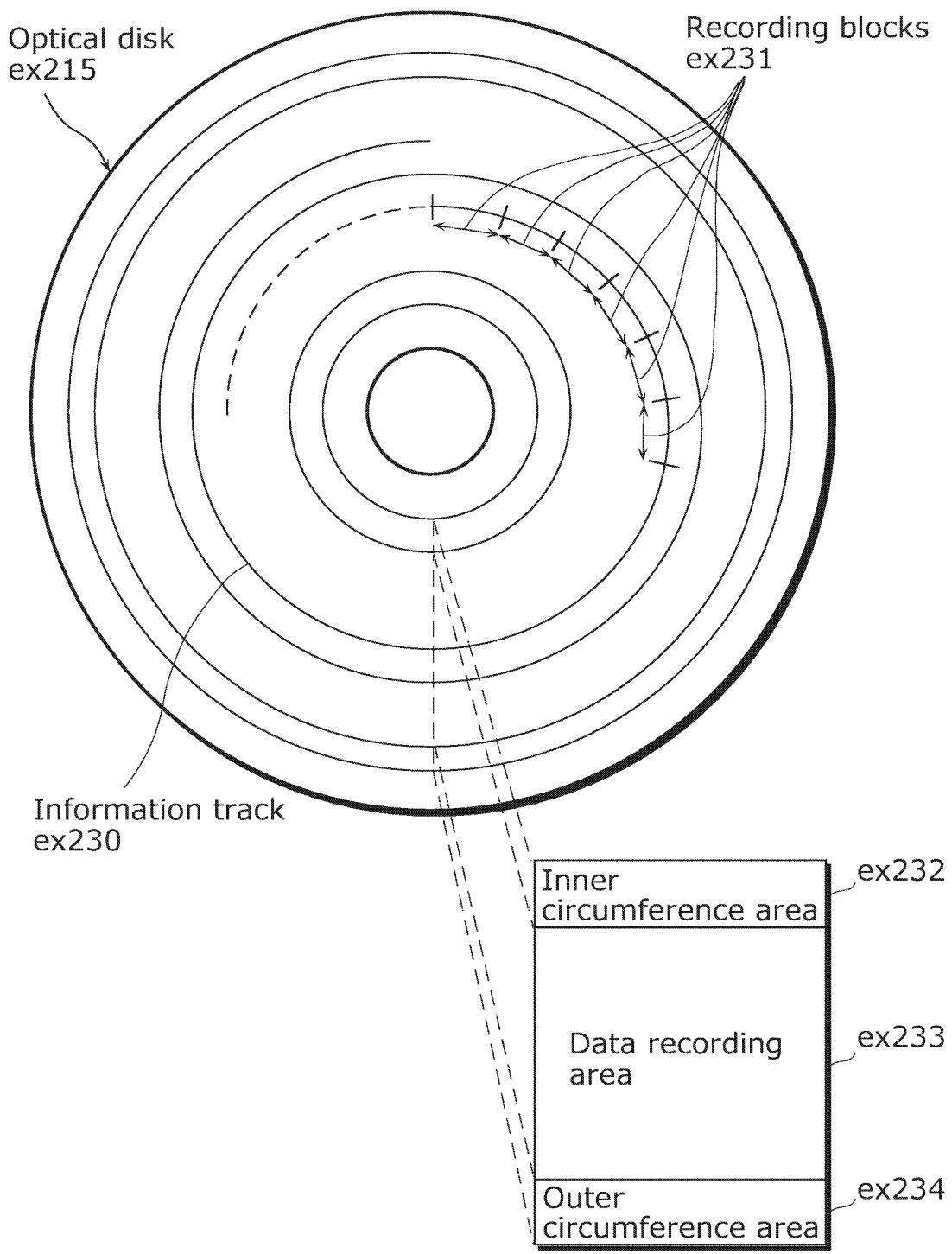
FIG. 20 shows an example of a configuration of a recording medium that is an optical disk.

FIG. 20 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
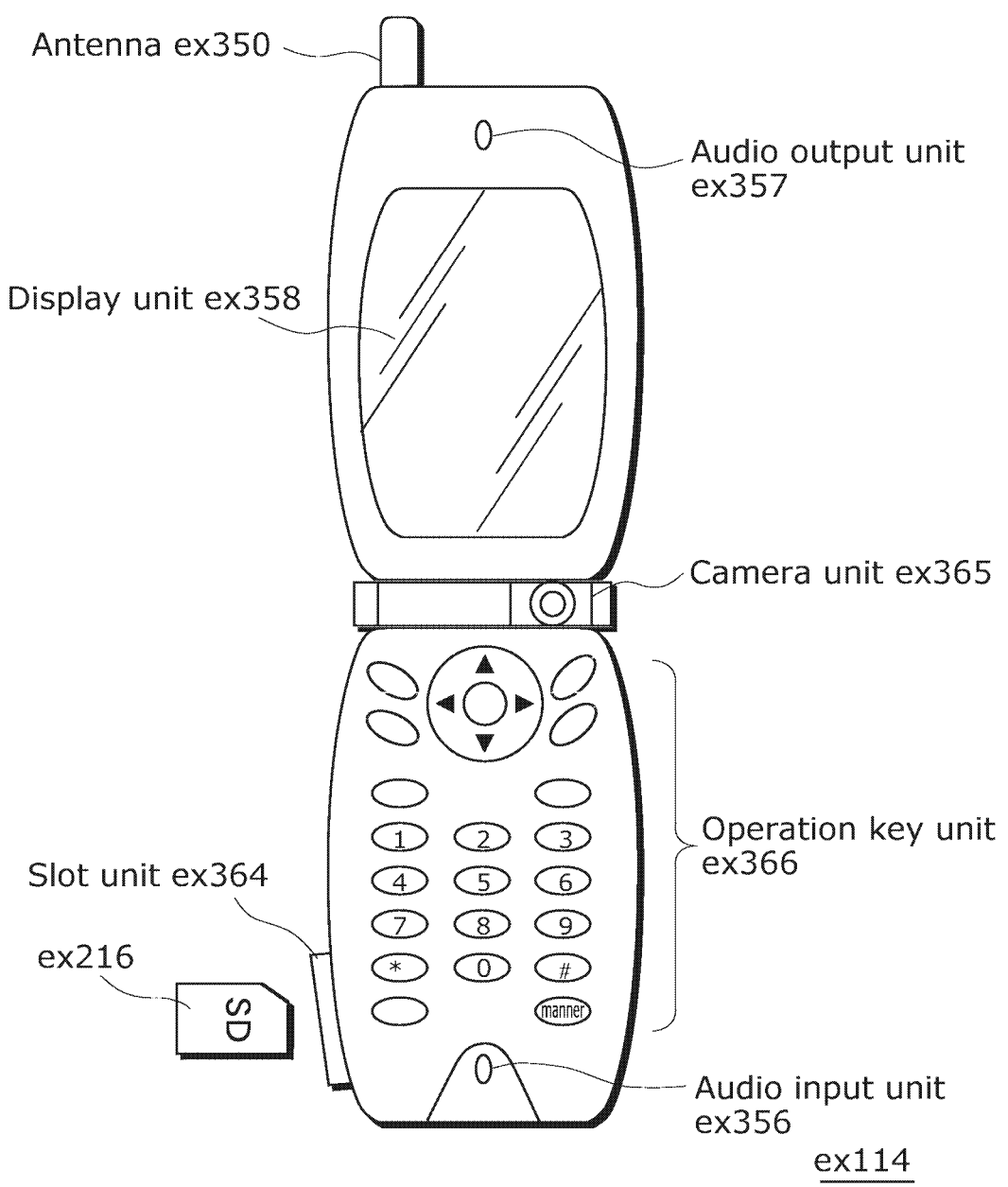
FIG. 21A shows an example of a cellular phone.

FIG. 21A illustrates the cellular phone ex114 that uses the moving picture coding method and the moving picture decoding method described in the above embodiment. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
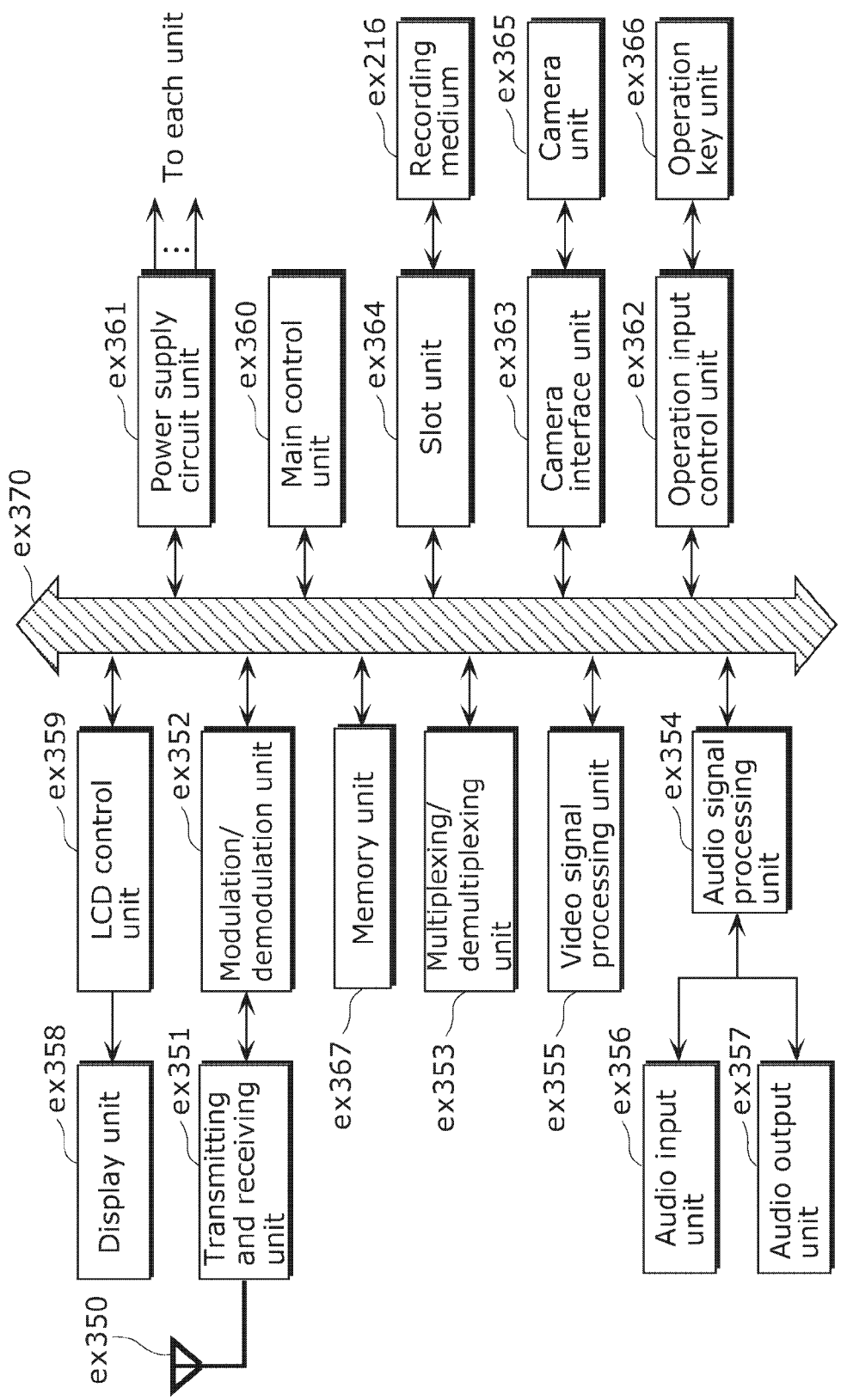
FIG. 21B shows an example of a configuration of the cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in the above embodiment (that is, the video signal processing unit ex355 functions as the image coding apparatus according to an implementation of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (the modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in the above embodiment (that is, the video signal processing unit ex355 functions as the image decoding apparatus according to an implementation of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in the above embodiment can be used in any of the devices and systems described. Thus, the advantages described in the above embodiment can be obtained.

Furthermore, the present invention is not limited to the above embodiment, and various modifications and revisions are possible without departing from the scope of the present invention.

(Embodiment 3)

Video data can be generated by switching, as necessary, between (i) the moving picture coding method or the moving picture coding apparatus shown in the above embodiment and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in the above embodiment will be hereinafter described. The multiplexed data is a digital stream in the MPEG2-Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in the above embodiment, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 23:
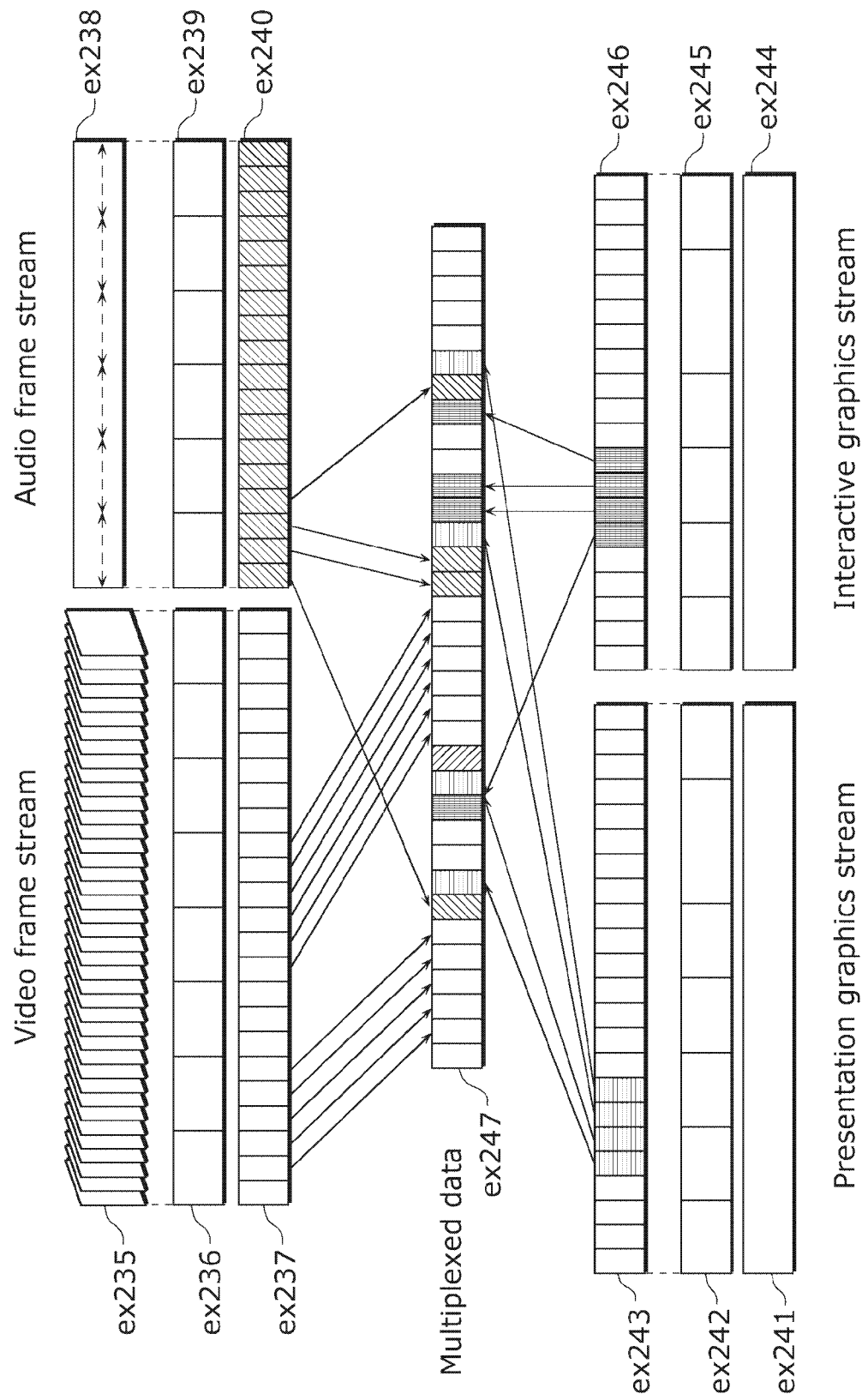
FIG. 23 schematically illustrates how each of streams is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
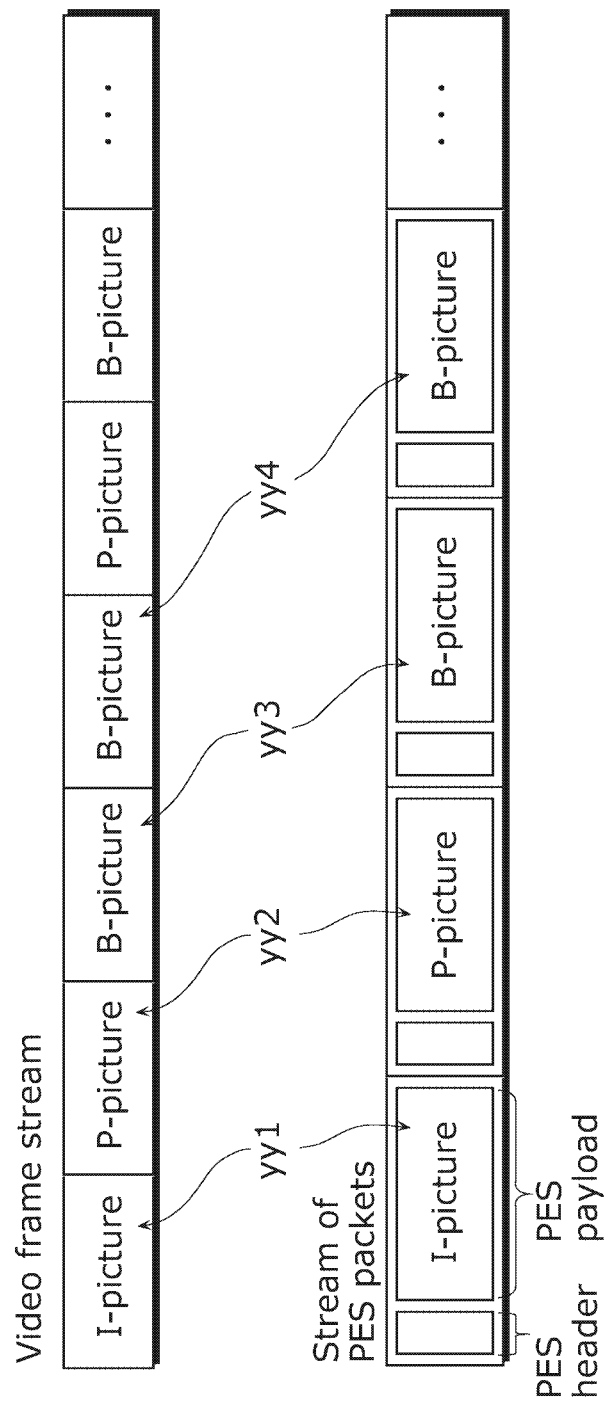
FIG. 24 illustrates how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information on the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
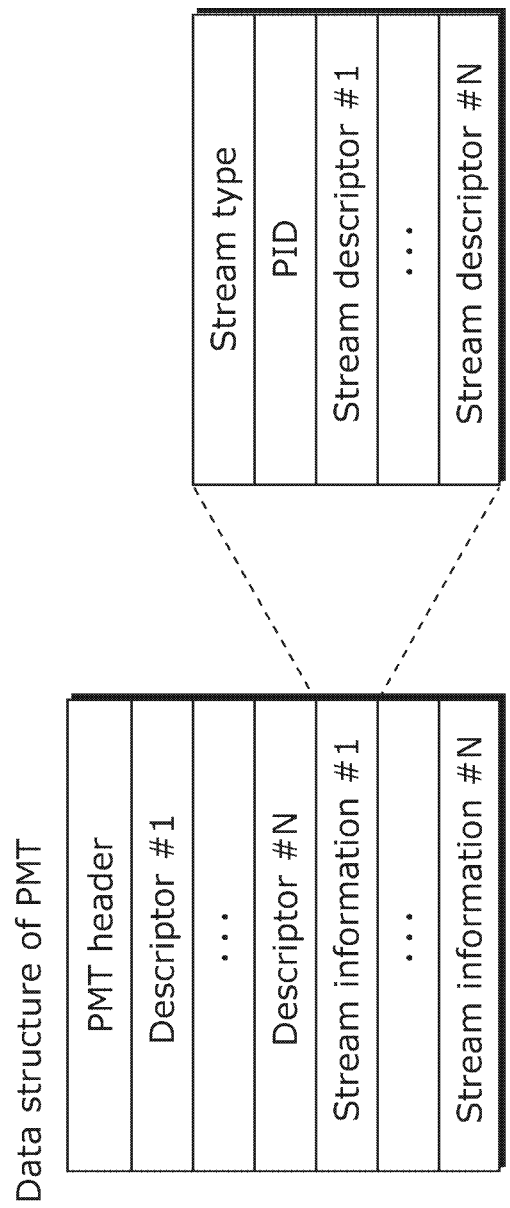
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
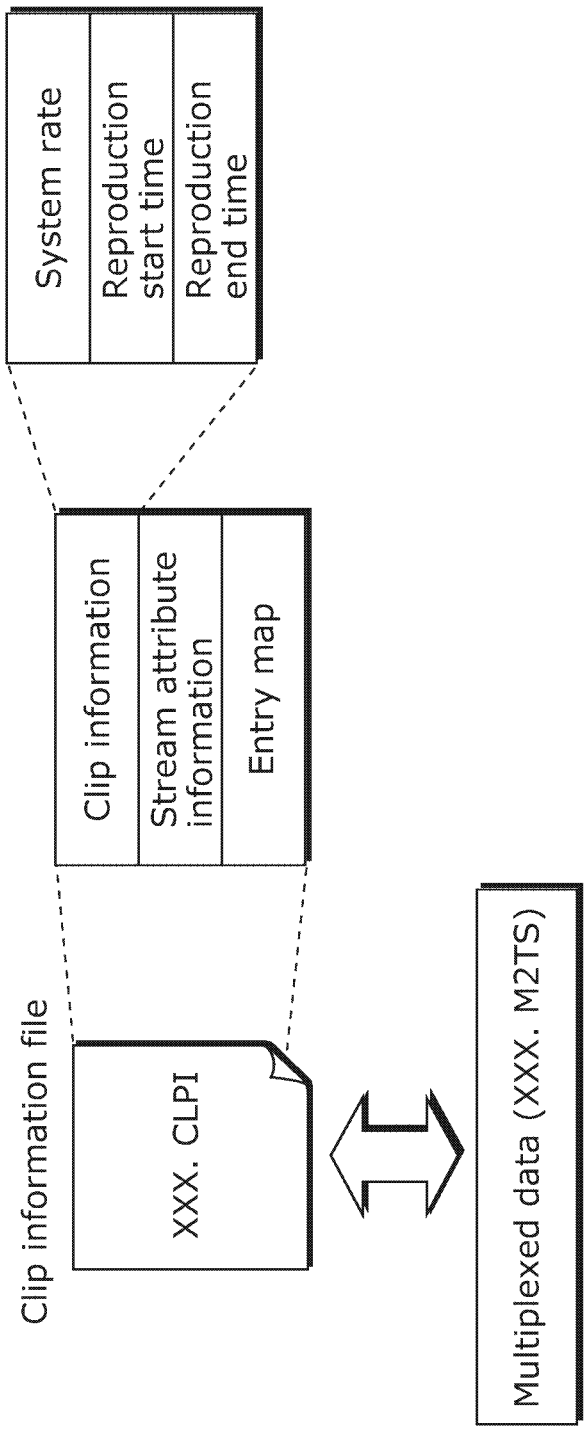
FIG. 27 shows an internal structure of multiplexed data information.

Each of the multiplexed data information files is management information on the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
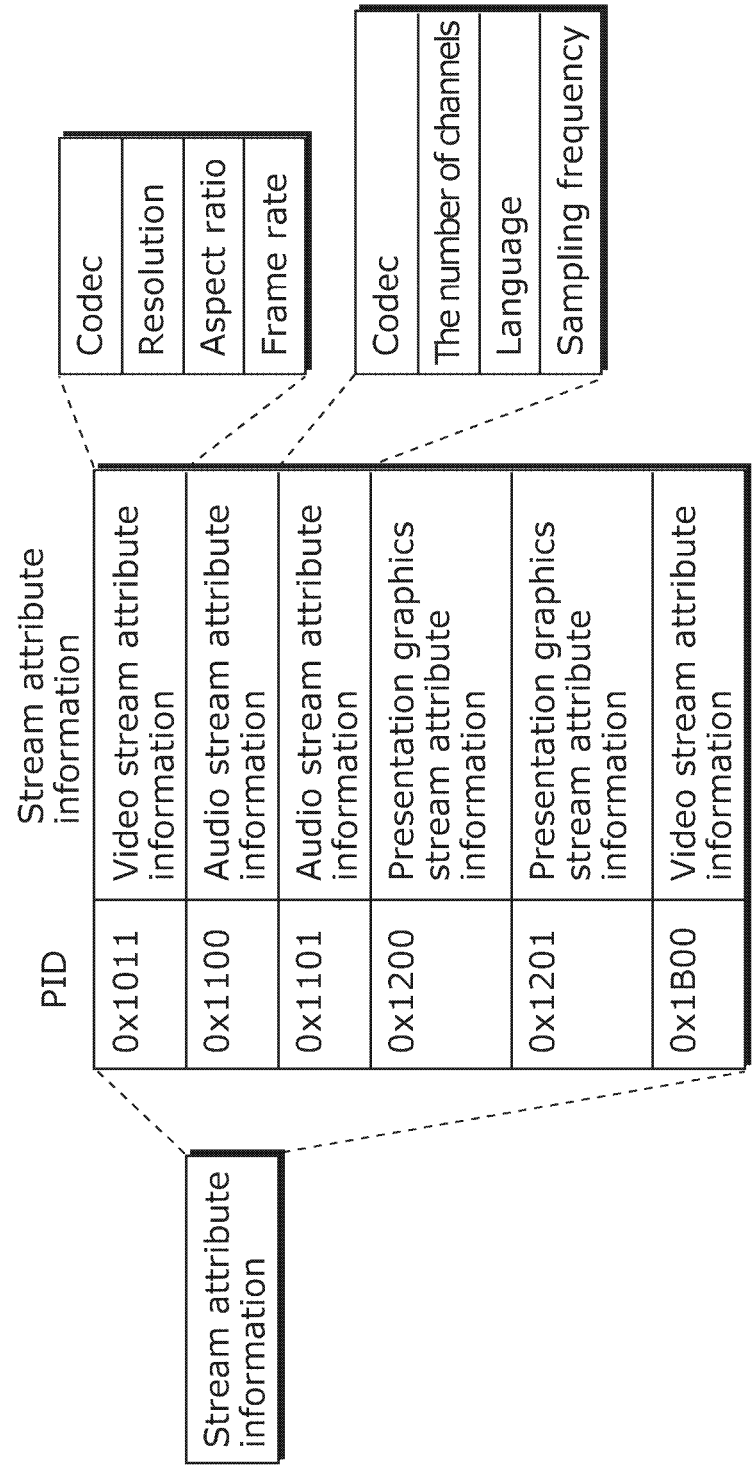
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In this embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in the above embodiment includes a step or a unit for allocating unique information indicating video data generated by the moving picture coding method or the moving picture coding apparatus in the above embodiment, to the stream type included in the PMT or the video stream attribute information. With the configuration, the video data generated by the moving picture coding method or the moving picture coding apparatus described in the above embodiment can be distinguished from video data that conforms to another standard.

Figure 29:
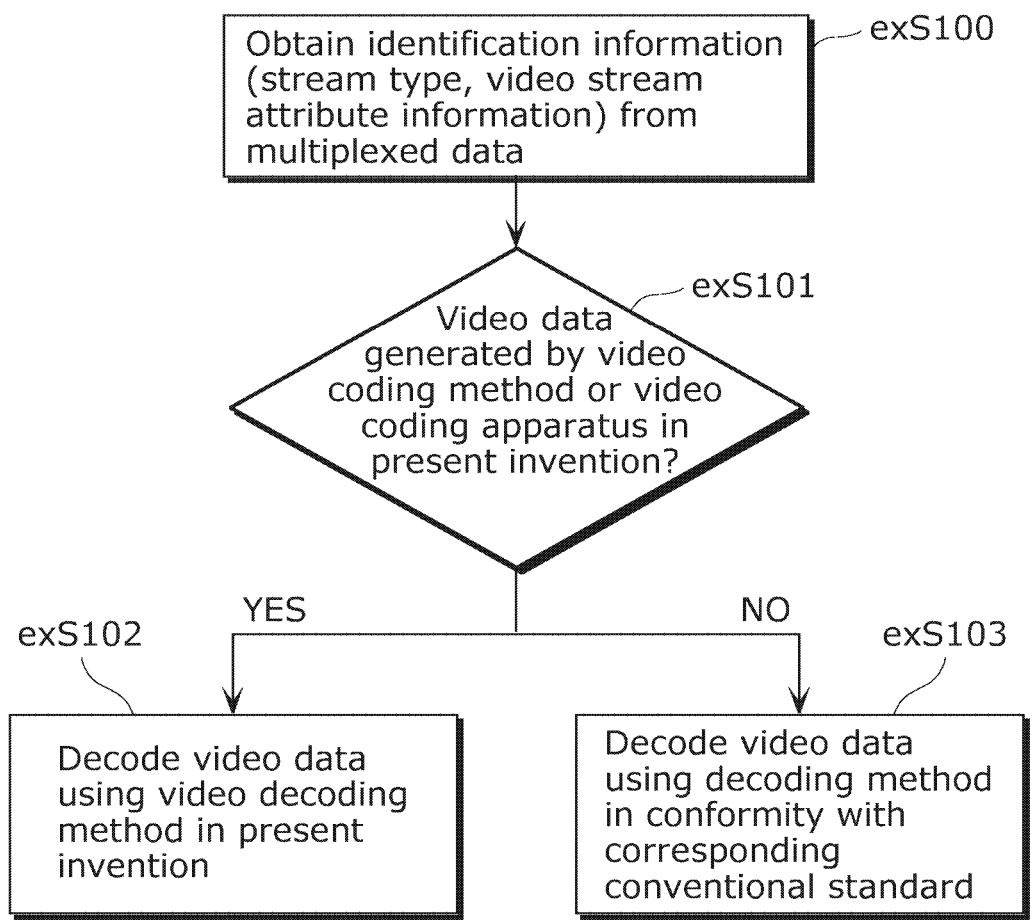
FIG. 29 shows steps for identifying video data.

Furthermore, FIG. 29 illustrates steps of the moving picture decoding method according to this embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in the above embodiment. When it is determined that the stream type or the video stream attribute information indicates that the multiplexed data is generated by the moving picture coding method or the moving picture coding apparatus in the above embodiment, in Step exS102, decoding is performed by the moving picture decoding method in the above embodiment. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in the above embodiment can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in this embodiment can be used in the devices and systems described above.

(Embodiment 4)

Figure 30:
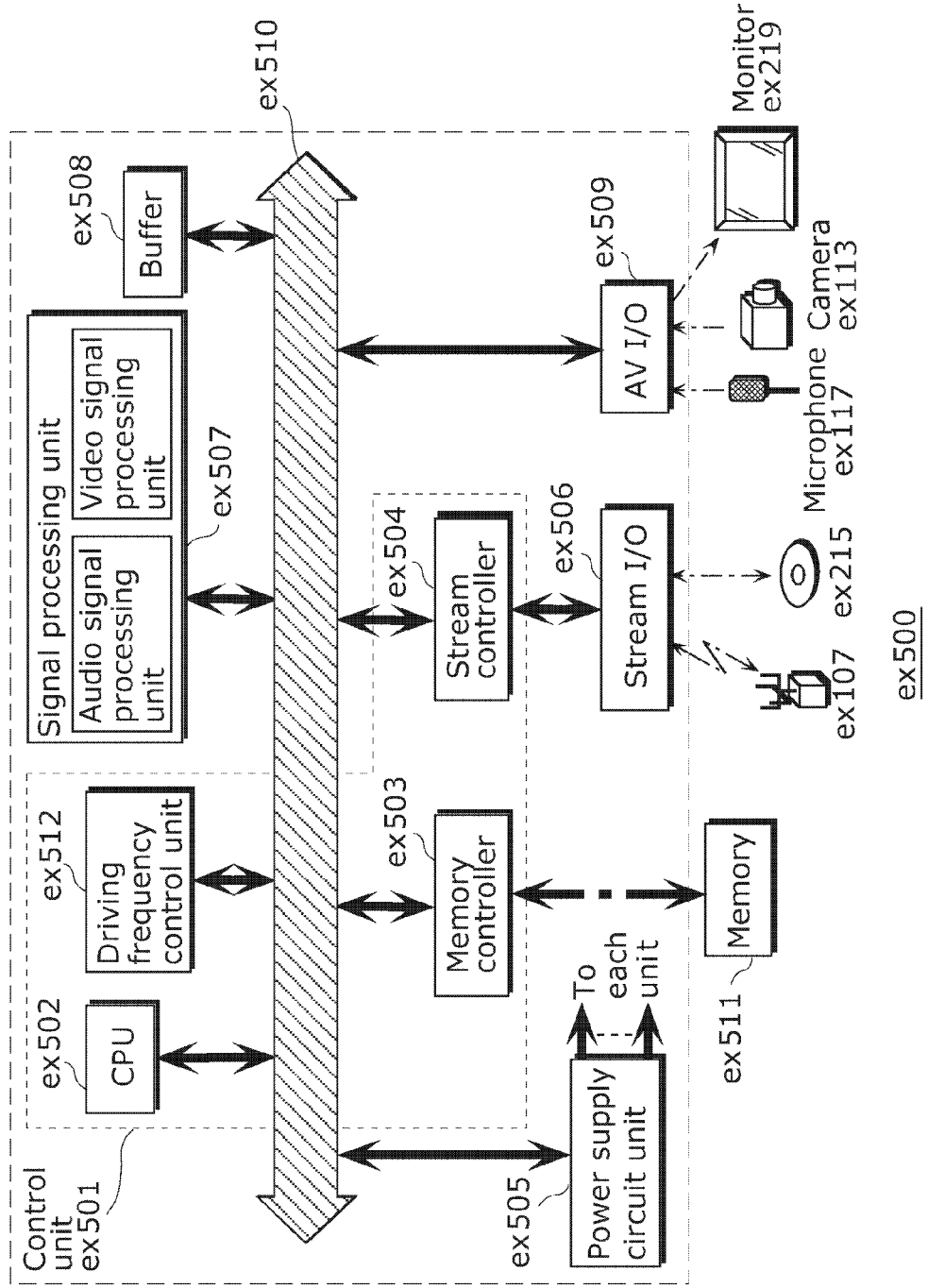
FIG. 30 is a block diagram illustrating an example of a configuration of an integrated circuit for implementing the moving picture coding method and the moving picture decoding method according to each embodiment.

Each of the moving picture coding method, the moving picture coding apparatus, the moving picture decoding method, and the moving picture decoding apparatus in the above embodiment is typically achieved in the form of an integrated circuit or a Large Scale Integrated (LSI) circuit. As an example, FIG. 30 illustrates a configuration of an LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in the above embodiment. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, and the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

(Embodiment 5)

When video data generated in the moving picture coding method or by the moving picture coding apparatus described in the above embodiment is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
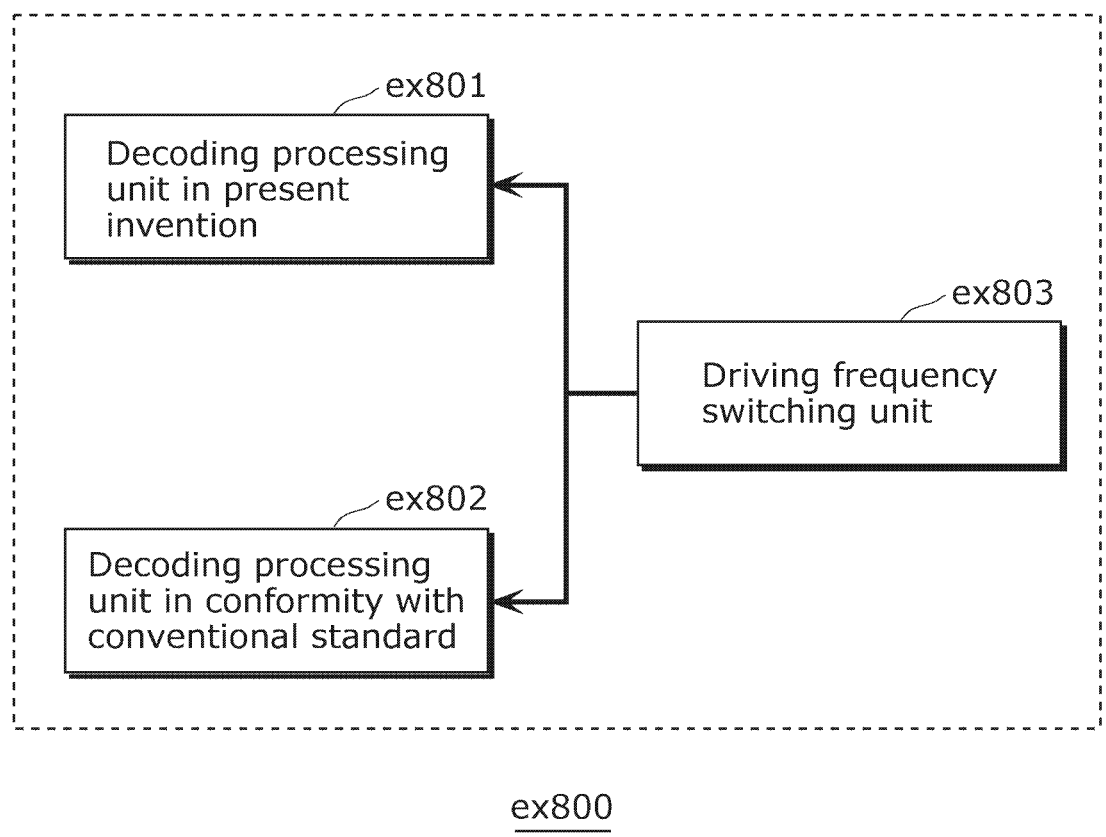
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in this embodiment. A driving frequency switching unit ex803 sets a driving frequency to a higher driving frequency when video data is generated by the moving picture coding method or the moving picture coding apparatus described in the above embodiment. Then, the driving frequency switching unit ex803 instructs a decoding processing unit ex801 that executes the moving picture decoding method described in the above embodiment to decode the video data. When the video data conforms to the conventional standard, the driving frequency switching unit ex803 sets a driving frequency to a lower driving frequency than that of the video data generated by the moving picture coding method or the moving picture coding apparatus described in the above embodiment. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in the above embodiment and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 or in an internal memory of an LSI, and referring to the look-up table by the CPU ex502.

Figure 32:
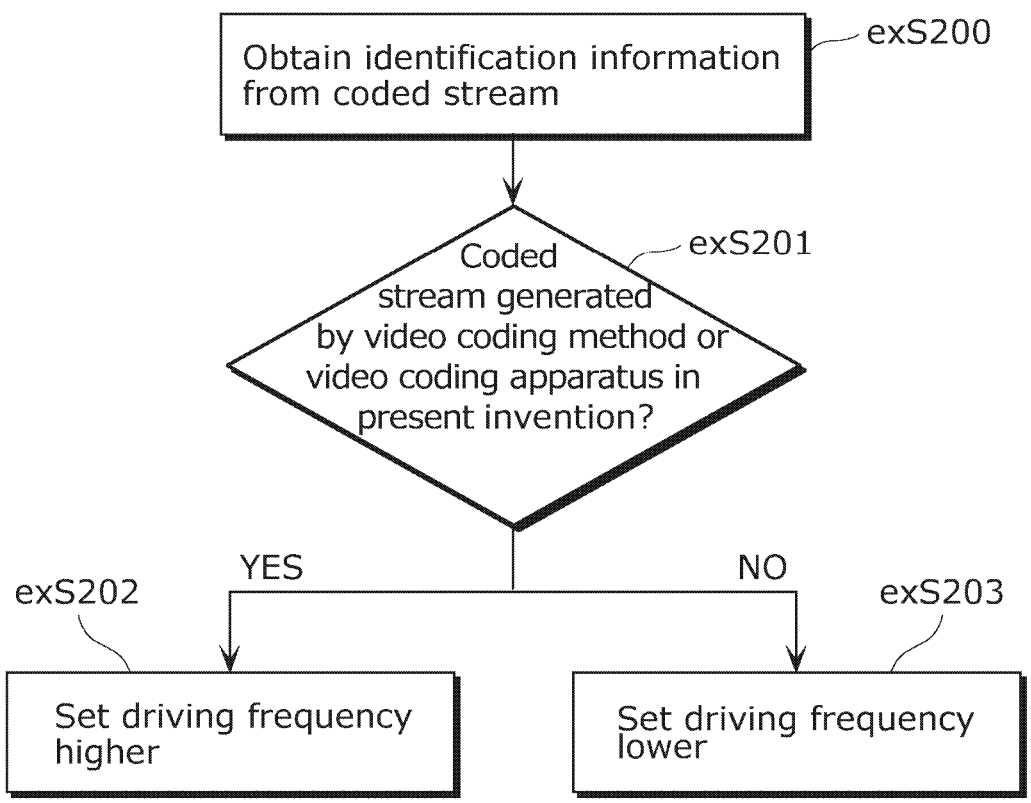
FIG. 32 shows steps for identifying video data and switching between driving frequencies.

FIG. 32 illustrates steps for executing a method in this embodiment. First, in Step exS200, the signal processing unit ex507 obtains identification information from the multiplexed data. Next, in Step exS201, the CPU ex502 determines whether or not the video data is generated by the coding method and the coding apparatus described in the above embodiment, based on the identification information. When the video data is generated by the coding method and the coding apparatus described in the above embodiment, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in the above embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the moving picture coding method and the moving picture coding apparatus described in the above embodiment, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in the above embodiment, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in the above embodiment, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in the above embodiment, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 6)

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
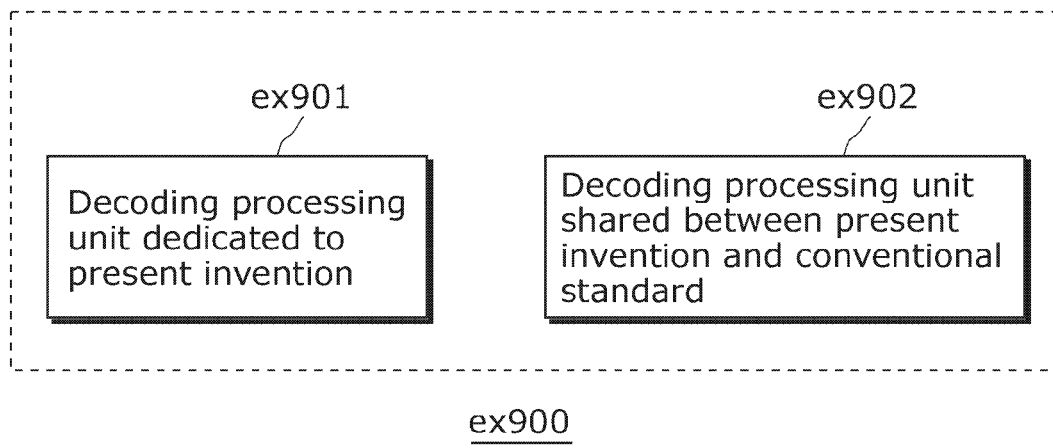
FIG. 34A shows an example of a configuration for sharing a module of a signal processing unit.

In order to solve the problem, what is conceived is a configuration in which the decoding processing unit for implementing the moving picture decoding method described in the above embodiment and the decoding processing unit that conforms to the conventional standard, such as MPEG-2, MPEG4-AVC, and VC-1 are partly shared. Ex900 in FIG. 34A shows an example of the configuration. For example, the moving picture decoding method described in the above embodiment and the moving picture decoding method that conforms to MPEG4-AVC have, partly in common, the details of processing, such as entropy coding, inverse quantization, deblocking filtering, and motion compensation. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to the present invention. Since the present invention is characterized by inter prediction in particular, for example, the dedicated decoding processing unit ex901 is used for inter prediction. Otherwise, the decoding processing unit is probably shared for one of the entropy coding, deblocking filtering, orthogonal transform, and quantization, or all of the processing. The decoding processing unit for implementing the moving picture decoding method described in the above embodiment may be shared for the processing to be shared, and a dedicated decoding processing unit may be used for processing unique to that of MPEG4-AVC.

Figure 34B:
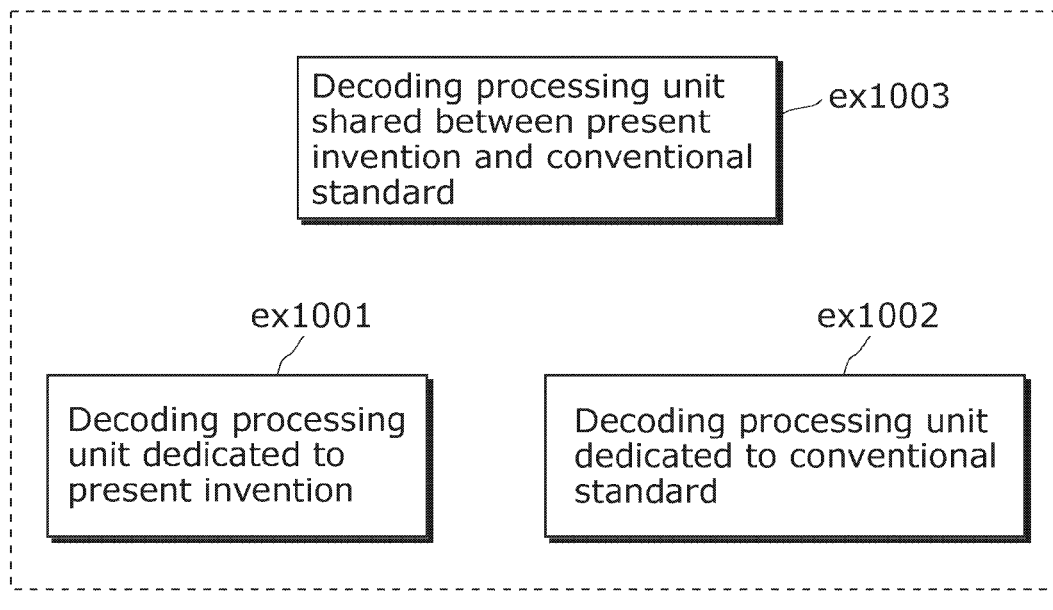
Figure 35A:
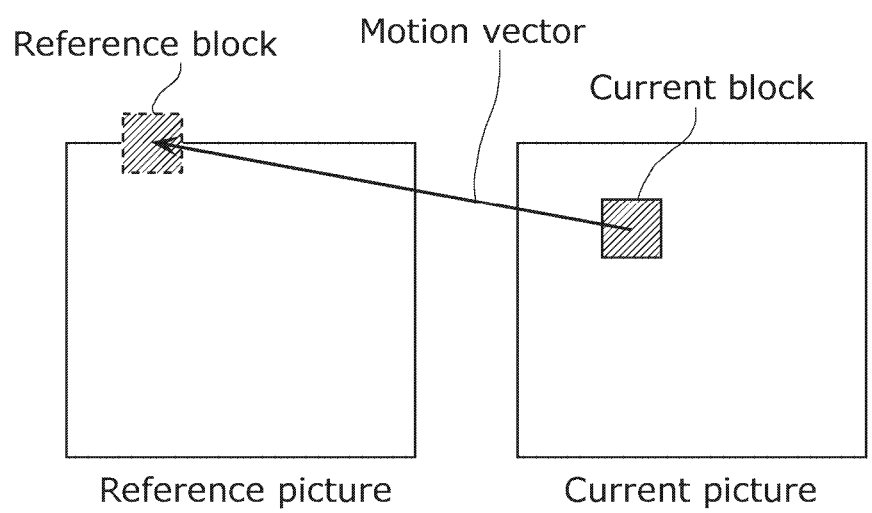
FIG. 35A is a conceptual diagram showing prediction image generation according to the related art.
Figure 35B:
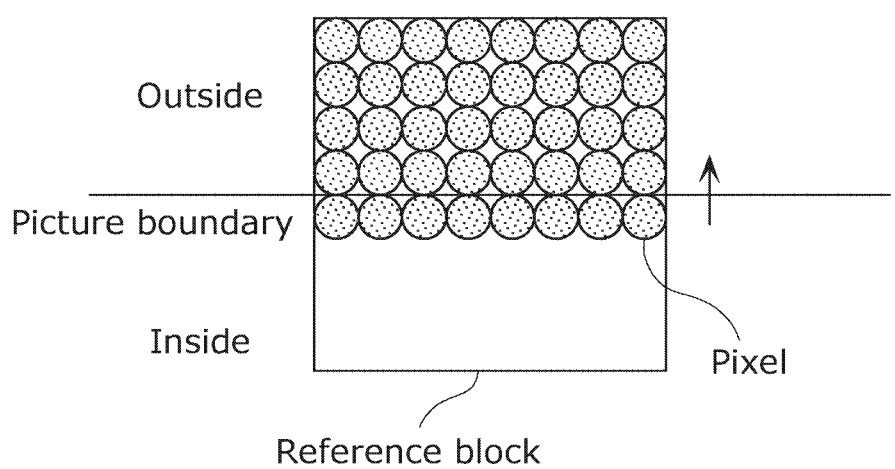
FIG. 35B is a conceptual diagram showing a stretching process according to the related art.

Furthermore, ex1000 in FIG. 34B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of this embodiment can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The image decoding method and the image coding method according to implementations of the present invention can be used in televisions, digital video recorders, car navigation systems, cellular phones, digital cameras, or digital video cameras, for example.

REFERENCE SIGNS LIST

100 Image decoding apparatus
101 Decoding unit
102, 402 Prediction image generation unit
103, 410 Addition unit
104, 405 Control unit
105, 408 Inverse quantization unit
106, 409 Inverse frequency transform unit
107, 411 Deblocking filter unit
108, 412 Storage unit
109, 413 Memory unit
110, 414 Intra-frame prediction unit
111, 415 Motion compensation unit
112, 416 Switch unit
400 Image coding apparatus
401 Motion estimation unit
403 Subtraction unit
404 Coding unit
406 Frequency transform unit
407 Quantization unit

The invention claimed is:

1. An image coding method for coding, on a per-block basis, pictures each including slices, the method comprising:
    estimating a current motion vector which is a motion vector of a current block to be coded and specifies a reference block included in a reference picture;
    generating a prediction image block by allocating a value of an inside pixel to an outside pixel, the inside pixel being a pixel located inside an associated slice, the outside pixel being a pixel located outside the associated slice and included in the reference block specified by the current motion vector, and the associated slice being a slice included in the reference picture and corresponding to a current slice to be coded which includes the current block;
    subtracting the prediction image block from the current block to generate a difference image block; and
    coding the current motion vector and the difference image block.

2. The image coding method according to claim 1, comprising
    storing, into a memory unit, identification information for identifying a range of the associated slice specified in each of reference pictures,
    wherein in the generating, the outside pixel and the inside pixel are determined by referring to the identification information stored in the memory unit, and the value of the inside pixel is allocated to the outside pixel to generate the prediction image block.

3. The image coding method according to claim 2,
    wherein in the coding, the identification information is coded.

4. The image coding method according to claim 2,
    wherein in the storing, the identification information is stored into the memory unit when the range of the associated slice has been changed.

5. The image coding method according to claim 1,
    wherein in the coding, applicability information is coded, the applicability information indicating whether or not the value of the inside pixel is to be allocated to the outside pixel of the reference block, and
    in the generating, when the applicability information indicates that the value of the inside pixel is to be allocated to the outside pixel, the value of the inside pixel is allocated to the outside pixel of the reference block to generate the prediction image block.

6. The image coding method according to claim 5,
    wherein the coding includes coding the applicability information indicating whether or not the value of the inside pixel is to be allocated to the outside pixel of the reference block which includes a boundary of the associated slice, and
    in the generating, when the applicability information indicates that the value of the inside pixel is to be allocated, the value of the inside pixel is allocated to the outside pixel of the reference block which includes the boundary of the associated slice, to generate the prediction image block.

7. The image coding method according to claim 5,
    wherein the coding includes coding the applicability information indicating whether or not the value of the inside pixel is to be allocated to the outside pixel of the reference block which is entirely included in a non-associated slice different from the associated slice, and
    in the generating, when the applicability information indicates that the value of the inside pixel is to be allocated, the value of the inside pixel is allocated to the outside pixel of the reference block which is entirely included in the non-associated slice, to generate the prediction image block.

8. The image coding method according to claim 1,
    wherein in the coding, an offset value for shifting the associated slice is coded, and
    in the generating, the associated slice is shifted by as much as the offset value, and the value of the inside pixel which is a pixel located inside the associated slice resulting from the shifting is allocated to the outside pixel which is a pixel located outside the associated slice resulting from the shifting, to generate the prediction image block.

9. The image coding method according to claim 1,
    wherein in the generating, the value of the inside pixel which is a pixel spatially closest to the outside pixel among pixels included in the associated slice is allocated to the outside pixel, to generate the prediction image block.

10. An image coding apparatus comprising
    a processor which performs the image coding method according to claim 1.

* * * * *